(12) United States Patent
Wu

(10) Patent No.: US 12,519,575 B2
(45) Date of Patent: Jan. 6, 2026

(54) CHANNEL TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 371 days.

(21) Appl. No.: 18/188,557

(22) Filed: Mar. 23, 2023

(65) Prior Publication Data

US 2023/0231661 A1  Jul. 20, 2023

Related U.S. Application Data

(63) Continuation of application No. PCT/CN2020/118923, filed on Sep. 29, 2020.

(51) Int. Cl.
*H04L 1/1829* (2023.01)
*H04L 5/00* (2006.01)
*H04W 72/20* (2023.01)

(52) U.S. Cl.
CPC .......... *H04L 1/1854* (2013.01); *H04L 5/0053* (2013.01); *H04W 72/20* (2023.01)

(58) Field of Classification Search
CPC ..... H04L 1/1854; H04L 5/0053; H04W 72/20
See application file for complete search history.

(56) References Cited

U.S. PATENT DOCUMENTS

| | | | |
|---|---|---|---|
| 2019/0268971 A1 | 8/2019 | Talarico et al. | |
| 2021/0410122 A1* | 12/2021 | Ma | H04L 5/005 |
| 2022/0191081 A1* | 6/2022 | Kim | H04B 1/7156 |
| 2022/0294569 A1* | 9/2022 | Matsuda | H04L 1/1812 |
| 2023/0056251 A1* | 2/2023 | Lin | H04W 72/23 |

FOREIGN PATENT DOCUMENTS

| | | |
|---|---|---|
| CN | 110505698 A | 11/2019 |
| WO | 2019027308 A1 | 2/2019 |

OTHER PUBLICATIONS

Search Report for European Application No. 20955554.9 issued Aug. 24, 2023. 10 pages.

(Continued)

*Primary Examiner* — Michael Thier
*Assistant Examiner* — Nevena Zecevic Sandhu
(74) *Attorney, Agent, or Firm* — PERKINS COIE LLP

(57) ABSTRACT

Provided are a channel transmission method, a terminal device and a network device. When an HARQ process is disabled, HARQ scheduling limitation is enhanced, thereby ensuring that the problem of disorder does not occur in a processing time sequence of a terminal device. The channel transmission method comprises: a terminal device transmitting a PUSCH by using a first uplink HARQ process, wherein the first uplink HARQ process corresponds to a first state, and a time interval between two adjacent PUSCH transmissions corresponding to the first uplink HARQ process is greater than or equal to a first duration.

3 Claims, 9 Drawing Sheets

(56) References Cited

OTHER PUBLICATIONS

Catt, "Further consideration on HARQ operation" R1-1912166, 3GPP TSG RAN WG1 Meeting #99 Reno, USA, Nov. 18-22, 2019, 2 pages.
Panasonic, "Impact of disabling HARQ on DRX" R2-1912570, 3GPP TSG-RAN WG2 Meeting #107bis Chongqing, China, Oct. 14-18, 2019, 4 pages.
3GPP TS 38.213 V15.9.0 (Mar. 2020) Technical Specification 3rd Generation Partnership Project; Technical Specification Group Radio Access Network; NR; Physical layer procedures for control, 109 pages.
3GPP TS 38.214 V15.9.0 (Mar. 2020) Technical Specification 3rd Generation Partnership Project; Technical Specification Group Radio Access Network; NR; Physical layer procedures for data, 106 pages.
Written Opinion Mailed Jun. 24, 2021 In PCT App. PCT/CN2020-118923.
International Search Report Mailed Jun. 24, 2021 In PCT App. PCT/CN2020-118923.
Qualcomm, Enhancements on HARQ for NTN, 3GPP TSG RAN WG1 #102-e R1-2006806, e-Meeting, Aug. 17-28, 2020, 5 pages.
OPPO, Discussion on DRX operation in NTN, 3GPP TSG-RAN WG2 Meeting #107bis R2-1913336, , 54 Chongqing, China, Oct. 14-Oct. 18, 2019, 5 pages.
Nokia et al., Timing Advance, Random Access and DRX aspects in NTN, 3GPP TSG-RAN WG2 Meeting #111 Electronic R2-2007590, Elbonia, Aug. 17-28, 2020.
TSG RAN, Study on New Radio Access Technology, 3GPP TSG RAN meeting #75, RP-170376, Dubrovnik, Croatia, Mar. 6-9, 2017, 157 pages.
Examination Report of the European application No. 20955554.9, issued on May 2, 2025. 8 pages.

\* cited by examiner

CHANNEL TRANSMISSION METHOD, TERMINAL DEVICE AND NETWORK DEVICE

CROSS-REFERENCE TO RELATED APPLICATION(S)

The present application is a continuation application of International PCT Application No. PCT/CN2020/118923, filed on Sep. 29, 2020, the entire content of which is hereby incorporated by reference.

TECHNICAL FIELD

Implementations of the present disclosure relate to the field of communication, and more specifically, to a channel transmission method, a terminal device, and a network device.

BACKGROUND

In a 5-Generation mobile communication technology New Radio (5G NR) system, a Non-Terrestrial Network (NTN) system deployment scenario including a satellite network is defined. With a wide-area coverage capability of a satellite, an NTN system may realize continuity of 5G NR services. In addition, in the NTN system, in order to increase throughput of data transmission and reduce an influence of Round Trip Time (RTT) of signal transmission, Hybrid Automatic Repeat reQuest (HARQ) process disabling is introduced. In this case, how to design scheduling restrictions of downlink transmission and uplink transmission, so as to enhance HARQ scheduling restrictions in the NTN system, and ensure that a problem of out of order of a processing timing of a terminal device will not occur.

SUMMARY

The implementations of the application provide a channel transmission method, a terminal device, and a network device. In a case where an HARQ process is disabled, HARQ scheduling restrictions are enhanced to ensure that a problem of out of order of a processing timing of a terminal device will not occur.

In a first aspect, there is provided a channel transmission method, including: transmitting, by a terminal device, a Physical Uplink Shared Channel (PUSCH) using a first uplink Hybrid Automatic Repeat reQuest (HARQ) process, wherein the first uplink HARQ process corresponds to a first state, and a time interval between two adjacent PUSCH transmissions corresponding to the first uplink HARQ process is greater than or equal to a first time length.

Optionally, the first uplink HARQ process corresponds to the first state, including: the first uplink HARQ process is a disabled HARQ process; or, the first uplink HARQ process is configured with a disabling parameter.

In a second aspect, there is provided a channel transmission method, including: scheduling, by a network device, a terminal device to transmit a Physical Uplink Shared Channel (PUSCH) using a first uplink Hybrid Automatic Repeat reQuest (HARQ) process, wherein the first uplink HARQ process corresponds to a first state, and a time interval between two adjacent PUSCH transmissions corresponding to the first uplink HARQ process is greater than or equal to a first time length.

Optionally, the first uplink HARQ process corresponds to the first state, including: the first uplink HARQ process is a disabled HARQ process; or, the first uplink HARQ process is configured with a disabling parameter.

In a third aspect, there is provided a channel transmission method, including: receiving, by a terminal device, a Physical Downlink Shared Channel (PDSCH) sent by a network device using a first downlink Hybrid Automatic Repeat reQuest (HARQ) process, wherein the first downlink HARQ process corresponds to a first state, and a time interval between two adjacent PDSCH transmissions corresponding to the first downlink HARQ process is greater than or equal to a third time length.

Optionally, the first downlink HARQ process corresponds to the first state, including: the first downlink HARQ process is a disabled HARQ process; or, the first downlink HARQ process is configured with a disabling parameter; or the first downlink HARQ process does not correspond to an uplink Hybrid Automatic Repeat request-Acknowledgement (HARQ-ACK) feedback.

In a fourth aspect, there is provided a channel transmission method, including: sending, by a network device, a Physical Downlink Shared Channel (PDSCH) to a terminal device using a first downlink Hybrid Automatic Repeat reQuest (HARQ) process, wherein the first downlink HARQ process corresponds to a first state, and a time interval between two adjacent PDSCH transmissions corresponding to the first downlink HARQ process is greater than or equal to a third time length.

Optionally, the first downlink HARQ process corresponds to the first state, including: the first downlink HARQ process is a disabled HARQ process; or, the first downlink HARQ process is configured with a disabling parameter; or the first downlink HARQ process does not correspond to an uplink HARQ-ACK feedback.

In a fifth aspect, there is provided a terminal device, which is configured to perform the method in the above first aspect.

Specifically, the terminal device includes functional modules configured to perform the method in the above first aspect.

In a sixth aspect, there is provided a network device, which is configured to perform the method in the above second aspect.

Specifically, the network device includes functional modules configured to perform the method in the above second aspect.

In a seventh aspect, there is provided a terminal device, which is configured to perform the method in the above third aspect.

Specifically, the terminal device includes functional modules configured to perform the method in the above third aspect.

In an eighth aspect, there is provided a network device, which is configured to perform the method in the above fourth aspect.

Specifically, the network device includes functional modules configured to perform the method in the above fourth aspect.

In a ninth aspect, there is provided a terminal device, including a processor and a memory. The memory is configured to store a computer program, and the processor is configured to call and run the computer program stored in the memory to perform the method in the above first aspect.

In a tenth aspect, there is provided a network device, including a processor and a memory. The memory is configured to store a computer program, and the processor is configured to call and run the computer program stored in the memory to perform the method in the above second aspect.

In an eleventh aspect, there is provided a terminal device, including a processor and a memory. The memory is configured to store a computer program, and the processor is configured to call and run the computer program stored in the memory to perform the method in the above third aspect.

In a twelfth aspect, there is provided a network device, including a processor and a memory. The memory is configured to store a computer program, and the processor is configured to call and run the computer program stored in the memory to perform the method in the above fourth aspect.

In a thirteenth aspect, there is provided an apparatus, which is configured to perform the method in any one of the first aspect to the fourth aspect.

Specifically, the apparatus includes a processor, configured to call and run a computer program from a memory, so that a device installed with the apparatus is enabled to perform the method in any one of the first aspect to the fourth aspect.

In a fourteenth aspect, there is provided a computer-readable storage medium, which is configured to store a computer program, wherein the computer program enables a computer to perform the method in any one of the first aspect to the fourth aspect.

In a fifteenth aspect, there is provided a computer program product, which includes computer program instructions, wherein the computer program instructions enable a computer to perform the method in any one of the first aspect to the fourth aspect.

In a sixteenth aspect, there is provided a computer program, which, when is run on a computer, enables the computer to perform the method in any one of the first aspect to the fourth aspect.

According to technical solutions of the first aspect and the second aspect, in a case where a first uplink HARQ process corresponds to a first state, a time interval between two adjacent PUSCH transmissions corresponding to the first uplink HARQ process is greater than or equal to a first time length. Thereby, uplink HARQ scheduling restrictions are enhanced, and it is ensured that a problem of out of order of a processing timing of a terminal device will not occur.

According to technical solutions of the third aspect and the fourth aspect, in a case where a first downlink HARQ process corresponds to a first state, a time interval between two adjacent PDSCH transmissions corresponding to the first downlink HARQ process is greater than or equal to a third time length. Thereby, downlink HARQ scheduling restrictions are enhanced, and it is ensured that a problem of out of order of a processing timing of a terminal device will not occur.

DETAILED DESCRIPTION

Figure 1A:
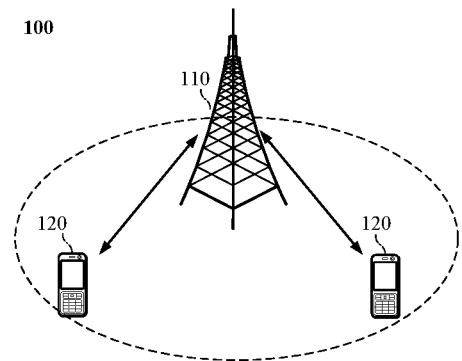
FIG. 1A to FIG. 1C are schematic diagrams of an application scenario according to an implementation of the present disclosure.

Technical solutions in the implementations of the present disclosure will be described below with reference to the accompanying drawings in the implementations of the present disclosure. It is apparent that the implementations described are just a part of the implementations of the present disclosure, rather than all of the implementations of the present disclosure. With regard to the implementations of the present disclosure, all other implementations obtained by a person of ordinary skill in the art without making an inventive effort are within the protection scope of the present disclosure.

Technical solutions according to the implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Non-Terrestrial Network (NTN) system, a Universal Mobile Telecommunications System (UMTS), Wireless Local Area Networks (WLAN), Wireless Fidelity (WiFi), a 5th-generation (5G) communication system, or another communication system.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the implementations of the present disclosure may be applied to these communication systems as well.

Optionally, a communication system in an implementation of the present disclosure may be applied to a Carrier Aggregation (CA) scenario, or a Dual Connectivity (DC) scenario, or a Standalone (SA) network deployment scenario.

Optionally, the communication system in an implementation of the present disclosure may be applied to an unlicensed spectrum, wherein the unlicensed spectrum may also be considered as a shared spectrum; or, the communication system in an implementation of the present disclosure may also be applied to a licensed spectrum, wherein the licensed spectrum may also be considered as a non-shared spectrum.

Various implementations of the present disclosure are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a STATION (ST) in a WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, and a terminal device in a next generation communication system such as an NR network, or a terminal device in a future evolved Public Land Mobile Network (PLMN).

In an implementation of the present disclosure, a terminal device may be deployed on land including indoor or outdoor, handheld, wearable or vehicle-mounted terminal device; or it may be deployed on water (such as on ships, etc.); or it may be deployed aerially (such as in airplanes, balloons and satellites, etc.).

In an implementation of the present disclosure, the terminal device may be a mobile phone, a Pad, a computer with a wireless transceiving function, a virtual reality (VR) terminal device, an augmented reality (AR) terminal device, a wireless terminal device in industrial control, a wireless terminal device in self-driving, a wireless terminal device in remote medicine, a wireless terminal device in smart grid, a wireless terminal device in transportation safety, a wireless terminal device in smart city, or a wireless terminal device in smart home, etc.

As an example rather than limitation, in the implementations of the present disclosure, the terminal device may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices which are fully functional, have large sizes, and may implement complete or partial functions without relying on smart phones, such as a smart watch or smart glasses, and devices which focus on a certain kind of application functions only and need to be used in conjunction with other devices such as smart phones, such as various smart bracelets, smart jewelries or the like for monitoring physical signs.

In the implementations of the present disclosure, the network device may be a device used for communicating with a mobile device, and may be an Access Point (AP) in a WLAN, a Base Transceiver Station (BTS) in GSM or CDMA, a NodeB (NB) in WCDMA, an evolutional Node B (eNB or eNodeB) in LTE, or a relay station or an access point, or a vehicle-mounted device, a wearable device, a network device or a base station (gNB) in an NR network, or a network device in a future evolved PLMN network, or a network device in an NTN network, etc.

As an example rather than limitation, in an implementation of present disclosure, the network device may be of mobility, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may be a base station disposed in a position on land or a water region etc.

In an implementation of the present disclosure, the network device may provide a service for a cell, and the terminal device communicates with the network device through a transmission resource (e.g., a frequency domain resource, which is also referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

Illustratively, a communication system 100 to which an implementation of the present disclosure is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area.

Illustratively, FIG. 1A is a schematic diagram of architecture of a communication system according to an implementation of the present disclosure. As shown in FIG. 1A, a communication system 100 may include a network device 110 which may be a device that communicates with a terminal device 120 (or referred to as a communication terminal, a terminal). The network device 110 may provide communication coverage for a specific geographical area, and may communicate with terminal devices located within the coverage area.

FIG. 1A illustratively shows one network device and two terminal devices. Optionally, the communication system 100 may include multiple network devices, and another quantity of terminal devices may be included within the coverage area of each network device, which is not limited in the implementations of the present disclosure.

Figure 1B:
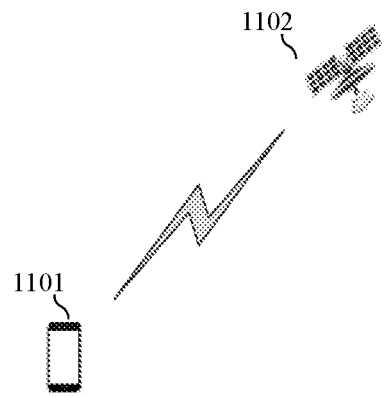

Illustratively, FIG. 1B is a schematic diagram of architecture of another communication system according to an implementation of the present disclosure. Referring to FIG. 1B, including a terminal device 1101 and a satellite 1102, wireless communication may be performed between the terminal device 1101 and the satellite 1102. A network formed between the terminal device 1101 and the satellite 1102 may also be referred to as an NTN. In architecture of the communication system shown in FIG. 1B, the satellite 1102 may have a function of a base station and direct communication may be performed between the terminal device 1101 and the satellite 1102. Under the architecture of the system, the satellite 1102 may be referred to as a network device. Optionally, the communication system may include multiple network devices 1102, and a coverage area of each network device 1102 may include another quantity of terminal devices, which is not limited in the implementations of the present disclosure.

Figure 1C:
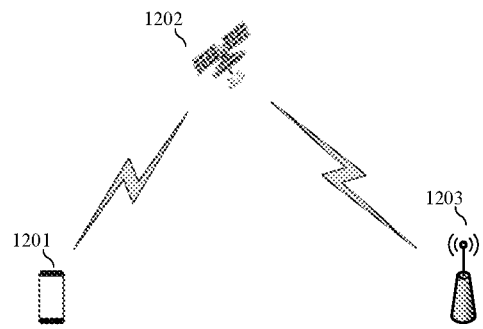

Illustratively, FIG. 1C is a schematic diagram of architecture of another communication system according to an implementation of the present disclosure. Referring to FIG. 1C, including a terminal device 1201, a satellite 1202, and a base station 1203, wireless communication may be performed between the terminal device 1201 and the satellite 1202, and communication may be performed between the satellite 1202 and the base station 1203. A network formed among the terminal device 1201, the satellite 1202, and the base station 1203 may also be referred to as an NTN. In the architecture of the communication system shown in FIG. 1C, the satellite 1202 may not have a function of a base station and communication between the terminal device 1201 and the base station 1203 requires a transit through the satellite 1202. Under the architecture of the system, the base station 1203 may be referred to as a network device. Optionally, the communication system may include multiple network devices 1203, and a coverage area of each network device 1203 may include another quantity of terminal devices, which is not limited in the implementations of the present disclosure.

It should be noted that FIG. 1A to FIG. 1C illustrate systems to which the present disclosure is applicable by way of example only, and of course, the methods shown in the implementations of the present disclosure may also be applicable to other systems, such as a 5G communication system and an LTE communication system, and this is not specifically limited in the implementations of the present disclosure.

Optionally, wireless communication systems illustrated in FIG. 1A to FIG. 1C may further include other network entities such as a Mobility Management Entity (MME), an Access and Mobility Management Function (AMF), which is not limited in the implementations of the present disclosure.

It should be understood that a device with a communication function in a network/system in the implementations of the present disclosure may also be referred to as a communication device. Taking the communication system 100 shown in FIG. 1A as an example, the communication device may include a network device 110 and terminal devices 120 which have communication functions, and the network device 110 and the terminal devices 120 may be the specific devices described above, which will not be repeated here again. The communication device may also include another device in the communication system 100, for example, another network entity such as a network controller, a mobile management entity, or the like, which is not limited in the implementations of the present disclosure.

It should be understood that the terms "system" and "network" are often used interchangeably herein. The term "and/or" herein refers to an association relationship describing associated objects only, which indicates that there may be three kinds of relationships, for example, A and/or B may indicate three cases: A alone, both A and B, and B alone. In addition, the symbol "/" herein generally indicates that objects before and after the symbol "/" have an "or" relationship.

Terminologies used in implementation modes of the present disclosure are only for the purpose of explaining specific implementations of the present disclosure, but are not intended to limit the present disclosure. Terms "first", "second", "third" and "fourth", or the like in the specification, claims and drawings of the present disclosure are used to distinguish different objects but not used to describe a specific order. In addition, terms "include" and "have" and any variations thereof are intended to cover non-exclusive inclusion.

It should be understood that "indication" involved in implementations of the present disclosure may be a direct indication, may be an indirect indication, or may represent an association relationship. For example, A indicates B, which may mean that A indicates B directly, for example, B may be acquired through A; or it may mean that A indicates B indirectly, for example, A indicates C, and B may be acquired through C; or it may mean that there is an association between A and B.

In the description of the implementations of the present disclosure, the term "correspond" may mean that there is a directly corresponding or an indirectly corresponding relationship between two parties, or mean that there is an association between two parties, or mean a relationship such as indicating and being indicated, configuring and being configured, etc.

In the implementations of the present disclosure, "predefined" may be achieved by pre-storing corresponding codes, tables, or other ways that may be used for indicating relevant information in devices (e.g., including terminal devices and network devices), and specific implementation modes thereof are not limited in the present disclosure. For example, predefining may refer to defining in a protocol.

In the implementations of the present disclosure, the "protocol" may refer to a standard protocol in the communication field, for example, may include an LTE protocol, an NR protocol, and related protocols applied in future communication systems, which is not limited in the present disclosure.

In order to facilitate better understanding of the implementations of the present disclosure, an NTN system related to the present disclosure will be described.

An NTN generally adopts satellite communication to provide communication services to terrestrial users. Compared with terrestrial cellular network communication, satellite communication has many unique advantages. First of all, satellite communication is not limited by a user's region. For example, general land communication cannot cover regions such as oceans, mountains, and deserts where communication devices cannot be set up or regions where communication coverage is not performed due to sparse population. However, for satellite communication, since one satellite may cover a large land region and orbit around the earth, theoretically, every corner on the earth may be covered by the satellite communication. Secondly, satellite communication has great social value. The satellite communication may cover remote mountainous regions, poor and backward countries or regions at low costs, thereby allowing people in these regions to enjoy advanced voice communication and mobile Internet technologies, which is conducive to narrowing a digital gap with developed regions and promoting development of these regions. Thirdly, the satellite communication distance is long, and the communication cost does not increase significantly with the increase of communication distance. Finally, satellite communication has high stability and is not limited by natural disasters.

Communication satellites are classified as Low Earth Orbit (LEO) satellites, Medium Earth Orbit (MEO) satellites, Geostationary Earth Orbit (GEO) satellites, High Elliptical Orbit (HEO) satellites, and so on according to different orbital altitudes. At present, LEO and GEO are mainly studied.

An altitude of a LEO satellite ranges from 500 km to 1500 km, and a corresponding orbit period is about 1.5 hours to 2 hours. Signal propagation delay of single-hop communication between users is generally less than 20 milliseconds. Maximum satellite visual time is 20 minutes. A signal propagation distance is short, a link loss is small, and a transmission power requirement on a terminal device is not high.

Among them, an orbital altitude of a GEO satellite is 35786 km, and a rotation period around the earth is 24 hours. A signal propagation delay of single-hop communication between users is generally 250 milliseconds.

In order to ensure satellite's coverage and improve system capacity of a whole satellite communication system, a satellite use multi-beam to cover the land. One satellite may form dozens or even hundreds of beams to cover the land, wherein each satellite beam may cover a land region with a diameter of tens to hundreds of kilometers.

In order to facilitate better understanding of the implementations of the present disclosure, a timing relationship of an NR system and enhancement of a timing relationship of an NTN system related to the present disclosure are described.

Transmission timing of transmitting HARQ-ACK on a Physical Uplink Control Channel (PUCCH): for a time slot of PUCCH transmission, if an end position of Physical Downlink Shared Channel (PDSCH) reception is in a time slot n or an end position of Physical Downlink Control Channel (PDCCH) reception indicating Semi-Persistent Scheduling (SPS) PDSCH release is in a time slot n, a terminal device should transmit corresponding HARQ-ACK information on a PUCCH resource within a time slot $n+K_1$, wherein $K_1$ is the quantity of time slots and is indicated through a PDSCH-to-HARQ-timing-indicator information field in a Downlink Control Information (DCI) format or is provided through an HARQ feedback timing set (e.g., a dl-DataToUL-ACK field parameter). A last time slot of PUCCH transmission corresponding to $K_1=0$ is overlapped with a time slot of PDSCH reception or PDCCH reception indicating SPS PDSCH release.

In order to work normally in an NTN system, or to say, in order to overcome a large transmission delay in an NTN system, the above timing relationship needs to be enhanced. A simple solution is to introduce an offset parameter $K_{offset}$ into a system and apply this parameter to a related timing relationship.

Transmission timing for transmitting HARQ-ACK on a PUCCH: for a time slot of PUCCH transmission, a terminal device should transmit corresponding HARQ-ACK information on a PUCCH resource within a time slot $n+K_1+K_{offset}$.

In order to facilitate better understanding of the implementations of the present disclosure, NR HARQ scheduling restrictions related to the present disclosure will be described.

Based on specification in the NR protocol, a terminal device has a respective HARQ entity corresponding to each serving cell. Each HARQ entity maintains a group of parallel downlink HARQ processes and a group of parallel uplink HARQ processes. At present, each uplink carrier and each downlink carrier both support up to 16 HARQ processes. A base station may indicate the maximum quantity of HARQ processes to the terminal device through a Radio Resource Control (RRC) signaling semi-static configuration, according to a deployment situation of a network device. If the network device does not provide a corresponding configuration parameter, the quantity of default downlink HARQ processes is 8, and the maximum quantity of HARQ processes supported by each carrier of uplink is 16. Each HARQ process corresponds to an HARQ process Identity (ID). For downlink, a Broadcast Control Channel (BCCH) uses a dedicated broadcast HARQ process. For uplink, Message 3 (Msg 3) transmission in a four-step random process uses HARQ ID 0.

For downlink transmission, a terminal device detects DCI according to a configured DCI format 1_0, DCI format 1_1, or DCI format 1_2, and performs PDSCH decoding according to scheduling by DCI.

Figure 2:
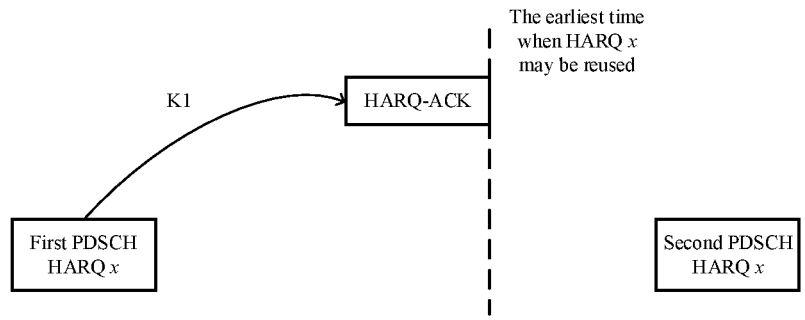
FIG. 2 is a schematic diagram of a case where a certain time interval needs to be met between two Physical Downlink Shared Channel (PDSCH) transmissions according to the present disclosure.

If a terminal device receives a first PDSCH transmitted by scheduling HARQ x by a network device, the terminal device does not expect to receive a second PDSCH transmitted by scheduling the HARQ x by the network device again before end of transmission of the HARQ-ACK feedback information corresponding to the first PDSCH sent by the terminal device to the network device, as shown in FIG. 2. Among them, transmission timing (denoted by K1) of the HARQ-ACK feedback information corresponding to the first PDSCH sent by the terminal device to the network device is determined according to an HARQ feedback timing set, the HARQ feedback timing set may be preset or configured by the network device.

Figure 3:
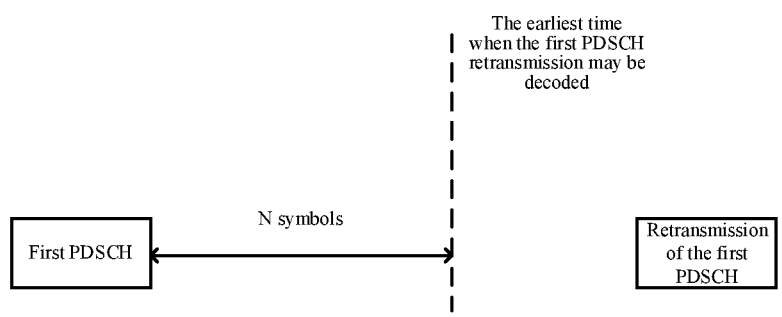
FIG. 3 is a schematic diagram of another case where a certain time interval needs to be met between two PDSCH transmissions according to the present disclosure.

In a designated scheduling cell, if a terminal device receives a first PDSCH corresponding to a System Information Radio Network Temporary Identifier (SI-RNTI) sent by a network device, the terminal device does not expect to decode retransmission of the first PDSCH by the network device within N symbols after a last symbol transmitted by the first PDSCH, as shown in FIG. 3, wherein a value of N is related to a subcarrier spacing configuration $\mu$ of the first PDSCH, wherein N=13 when $\mu=0$, N=13 when $\mu=1$, N=20 when $\mu=2$, and N=24 when $\mu=3$.

By the above two scheduling restrictions, it shows that a certain time interval between two PDSCH transmissions in a same HARQ process needs to be satisfied.

For uplink transmission, a terminal device detects DCI according to a configured DCI format 0_0, DCI format 0_1, or DCI format 0_2, and performs PUSCH transmission according to scheduling by DCI.

Figure 4:
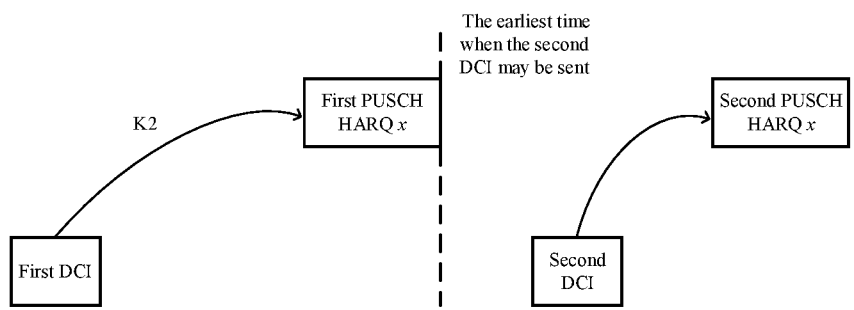
FIG. 4 is a schematic diagram of a case where a certain time interval needs to be met between two Physical Uplink Shared Channel (PUSCH) transmissions according to the present disclosure.

If a terminal device receives a first PUSCH transmitted by scheduling HARQ x through first DCI by a network device, the terminal device does not expect to receive again second DCI sent by the network device for scheduling the HARQ x to transmit a second PUSCH before end of transmission of the first PUSCH sent by the terminal device to the network device, as shown in FIG. 4, wherein the second DCI corresponds to a DCI format 0_0 or DCI format 0_1 scrambled by a Cell Radio Network Temporary Identifier (C-RNTI) or Modulation and Coding Scheme Cell Radio Network Temporary Identifier (MCS-C-RNTI).

In order to facilitate better understanding of the implementations of the present disclosure, PUSCH transmission and PUCCH transmission in an NR system related to the present disclosure will be described.

In the NR system, transmission of a PUSCH is determined according to an N2 processing capacity.

If a UE receives uplink authorization information from a base station, the uplink authorization information is used for scheduling the UE to send a target PUSCH carrying a target transport block and a Demodulation Reference Signal (DMRS), if the UE determines a start position of a first uplink symbol of the target PUSCH with an influence of a timing advance having been considered according to the uplink authorization information, for example, according to a Start and Length Indicator Value (SLIV) in the uplink authorization information, if the start position of the first uplink symbol is not earlier than a symbol L2, the UE should transmit the target transport block; otherwise, the UE ignores the scheduling DCI.

Among them, the symbol L2 is defined as a next uplink symbol after an end position of a last symbol of a PDCCH carrying the uplink authorization information, wherein a start position of a Cyclic Prefix (CP) of the next uplink symbol is later than a processing time $T_{proc,2}$, wherein $T_{proc,2}$ is determined according to a value of a Physical Uplink Shared Channel (PUSCH) preparation time N2 (for example, a unit is a symbol). For example, $T_{proc,2}$ is determined according to a following equation 1.

$$T_{proc,2} = \max((N_2+d_{2,1}+d_2)(2048+144)\cdot\kappa 2^{-\mu}\cdot T_c + T_{ext} + T_{switch}, d_{2,2}) \quad \text{equation 1}$$

It should be noted that meanings of various parameters in the equation 1 may refer to definitions in Section 6.4 of the Communication Protocol Standard TS38.214, which is not discussed here for simplicity. In addition, the meanings of various parameters in the equation 1 may be modified or updated in different communication protocol standards, and the present disclosure may be adjusted according to a corresponding communication protocol.

Among them, a processing capability 1 and a processing capability 2 of the UE respectively correspond to different processing capabilities, or to say, a value of N2 corresponding to the processing capability 1 of the UE and a value of N2 corresponding to the processing capability 2 of the UE are different.

Among them, values of N2 under different subcarrier spacings are different.

In an NR system, transmission of a PUCCH is determined according to a N1 processing capacity, or to say, transmission of a PUCCH is determined according to a PDSCH processing time of a UE.

If the UE receives downlink authorization information from a base station, the downlink authorization information is used for scheduling the UE to receive a PDSCH carrying a target transport block, the UE determines that HARQ-ACK information corresponding to the scheduled PDSCH is transmitted through a target PUCCH according to assigned HARQ-ACK timing information K1 and PUCCH resource indication information, and a start position of a first uplink symbol of the target PUCCH with an influence of a timing advance having been considered is not earlier than a symbol L1, then the UE should provide effective HARQ-ACK information of the scheduled PDSCH; otherwise, the UE may not provide effective HARQ-ACK information of the scheduled PDSCH.

Among them, the symbol L1 is defined as a next uplink symbol after an end position of a last symbol of the PDSCH carrying the target transport block, wherein a start position of a CP of the next uplink symbol is later than a processing time $T_{proc,1}$, wherein $T_{proc,1}$ is determined according to a value of a PDSCH decoding time N1 (for example, a unit is a symbol). For example, $T_{proc,1}$ is determined according to a following equation 2.

$$T_{proc,1} = (N_1+d_{1,1}+d_2)(2048+144)\cdot\kappa 2^{-\mu}\cdot T_c T_{ext} \quad \text{equation 2}$$

It should be noted that meanings of various parameters in the equation 2 may refer to definitions in Section 5.3 of the Communication Protocol Standard TS38.214, which is not discussed here for simplicity. In addition, the meanings of various parameters in the equation 2 may be modified or updated in different communication protocol standards, and the present disclosure may be adjusted according to a corresponding communication protocol.

Among them, a processing capability 1 and a processing capability 2 of the UE respectively correspond to different processing capabilities, or to say, a value of N1 corresponding to the processing capability 1 of the UE and a value of N1 corresponding to the processing capability 2 of the UE are different.

Among them, values of N1 under different subcarrier spacings are different.

In order to facilitate better understanding of the implementations of the present disclosure, NTN HARQ enhancement related to the present disclosure will be described.

In an NTN system, because of a long communication distance between a terminal device and a satellite (or a network device), RTT of signal transmission is very large. In a GEO system, RTT of signal transmission may be in an order of hundreds of milliseconds, for example, the maximum RTT of signal transmission may be about 600 milliseconds. In a LEO system, RTT of signal transmission may be in an order of tens of milliseconds. Since RTT of an NTN system is much larger than that of a terrestrial communication system, an HARQ mechanism in an existing NR system is no longer suitable for the NTN system.

At present, HARQ enhancement discussed in an NTN system includes: HARQ process disabling.

A network device may configure one or some downlink HARQ processes of a terminal device to be disabled. For a downlink HARQ process configured to be disabled, the network device does not need to receive HARQ-ACK information corresponding to a Transport Block (TB) transmitted in the HARQ process, that is, the HARQ process may be reused for data transmission. Therefore, the network device may schedule multiple downlink data packets for the terminal device by using the disabled downlink HARQ process, thereby increasing data transmission throughput and reducing an influence brought by RTT. For a downlink HARQ process that is not configured to be disabled, downlink transmission between the network device and the terminal device uses a same HARQ retransmission mechanism as an NR system.

The network device may also configure one or some uplink HARQ processes of the terminal device to be disabled. For an uplink HARQ process configured to be disabled, the network device does not need to receive a PUSCH transmitted by the terminal device through the HARQ process, that is, the HARQ process may be reused to schedule transmission of another PUSCH. Therefore, the network device may schedule multiple uplink data packets for the terminal device by using the disabled uplink HARQ process, thereby increasing data transmission throughput and reducing an influence brought by RTT. For an uplink HARQ process that is not configured to be disabled, uplink transmission between the network device and the terminal device uses a same HARQ retransmission mechanism as an NR system.

That is to say, in an NTN system, a HARQ process may correspond to two states, such as an enabled state and a non-enabled state (also called a disabled state), wherein if the HARQ process corresponds to the enabled state, it may be considered that a function of HARQ process is consistent with that in the NR system.

In the NTN system, the HARQ process corresponding to the disabled state is introduced. In this case, how to re-design scheduling restrictions of downlink transmission and uplink transmission to enhance HARQ scheduling restrictions in the NTN system and ensure that a problem of out of order of a processing timing of the terminal device will not occur, is an urgent problem to be solved in the present disclosure.

Based on the above problem, the present disclosure provides a channel transmission solution. In an NTN system, in a case where an HARQ process is disabled, HARQ scheduling restrictions are enhanced to ensure that a problem of out of order of a processing timing of a terminal device will not occur.

Technical solutions of the present disclosure will be described in detail below with specific implementations.

Figure 5:
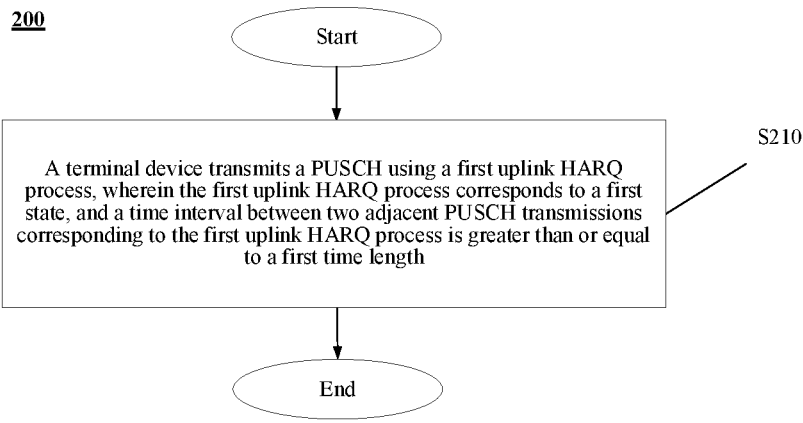
FIG. 5 is a schematic flowchart of a channel transmission method according to an implementation of the present disclosure.

FIG. 5 is a schematic flowchart of a channel transmission method 200 according to an implementation of the present disclosure. As shown in FIG. 5, the method 200 may include at least part of following contents.

In S210, a terminal device transmits a PUSCH using a first uplink HARQ process, wherein the first uplink HARQ process corresponds to a first state, and a time interval between two adjacent PUSCH transmissions corresponding to the first uplink HARQ process is greater than or equal to a first time length.

That is, a time interval between an nth PUSCH transmission and an (n−1)th PUSCH transmission corresponding to the first uplink HARQ process is greater than or equal to the first time length, n is a positive integer, and n is greater than or equal to 2.

Optionally, the first uplink HARQ process corresponds to the first state, including: the first uplink HARQ process is a disabled HARQ process; or, the first uplink HARQ process is configured with a disabling parameter.

It should be noted that for a first uplink HARQ process corresponding to a disabled state, a network device does not need to receive a PUSCH 1 carrying a TB 1 transmitted in the first uplink HARQ process, that is, it may reuse the first uplink HARQ process to schedule transmission of a PUSCH 2 carrying a TB 2. Among them, the TB 1 and the TB 2 may be the same TBs or different TBs. However, when the network device reuses the first uplink HARQ process to transmit the TB 2, it is necessary to ensure that a time interval between the PUSCH 1 transmitting the TB 1 and the PUSCH 2 transmitting the TB 2 is greater than or equal to the first time length, so as to ensure that the terminal device may have enough time to prepare for transmission of the PUSCH 2 after transmission of the PUSCH 1 when transmitting the PUSCH 2. In addition, DCI for scheduling the PUSCH 2 may be received before, after, or during PUSCH 1 transmission.

Optionally, in some implementations, in the S210, the time interval between two adjacent PUSCH transmissions corresponding to the first uplink HARQ process is greater than or equal to the first time length, which may specifically include at least one of Examples 1 to 3 below.

Example 1, the terminal device receives a first PDCCH, the first PDCCH is used for scheduling the terminal device to transmit a first PUSCH using the first uplink HARQ process, wherein the first PUSCH includes at least one PUSCH; and the terminal device does not expect to be scheduled to transmit a second PUSCH using the first uplink HARQ process within the first time length after a last symbol transmitted by a target PUSCH in the first PUSCH.

Example 2, the terminal device receives a first PDCCH, the first PDCCH is used for scheduling the terminal device to transmit a first PUSCH using the first uplink HARQ process, wherein the first PUSCH includes at least one PUSCH; and the terminal device does not transmit a second PUSCH in a case where the terminal device is scheduled to transmit the second PUSCH using the first uplink HARQ process within the first time length after a last symbol transmitted by a target PUSCH in the first PUSCH.

Example 3, the terminal device receives a first PDCCH, the first PDCCH is used for scheduling the terminal device to transmit a first PUSCH using the first uplink HARQ process, wherein the first PUSCH includes at least one PUSCH; and the terminal device transmits a second PUSCH in a case where the terminal device is scheduled to transmit the second PUSCH using the first uplink HARQ process after the first time length after a last symbol transmitted by a target PUSCH in the first PUSCH.

Optionally, the at least one PUSCH included in the first PUSCH may be used for transmitting a first TB. That is, each of the at least one PUSCH included in the first PUSCH is used for transmitting a first TB. For example, the first PUSCHs include PUSCH 1 and PUSCH 2, the PUSCH 1 is used for transmitting a first TB and the PUSCH 2 is also used for transmitting the first TB.

Optionally, the first PUSCH corresponds to a kth PUSCH transmission and the second PUSCH corresponds to a (k+1)th PUSCH transmission.

Optionally, the target PUSCH is a first PUSCH in the first PUSCHs; or, the target PUSCH is a last PUSCH in the first PUSCHs.

Optionally, the first PUSCH is scheduled through one PDCCH, or the first PUSCH corresponds to one PDCCH.

Optionally, the first PUSCH is a PUSCH scheduled by a PDCCH, or the first PUSCH is a Semi-Persistent Scheduling (SPS) PUSCH, or the first PUSCH is a Configured Grant (CG) PUSCH.

Optionally, the first PUSCHs include at least two PUSCHs, wherein the at least two PUSCHs are continuous in a time domain, or the at least two PUSCHs occupy at least two continuous time slots in a time domain.

Figure 6:
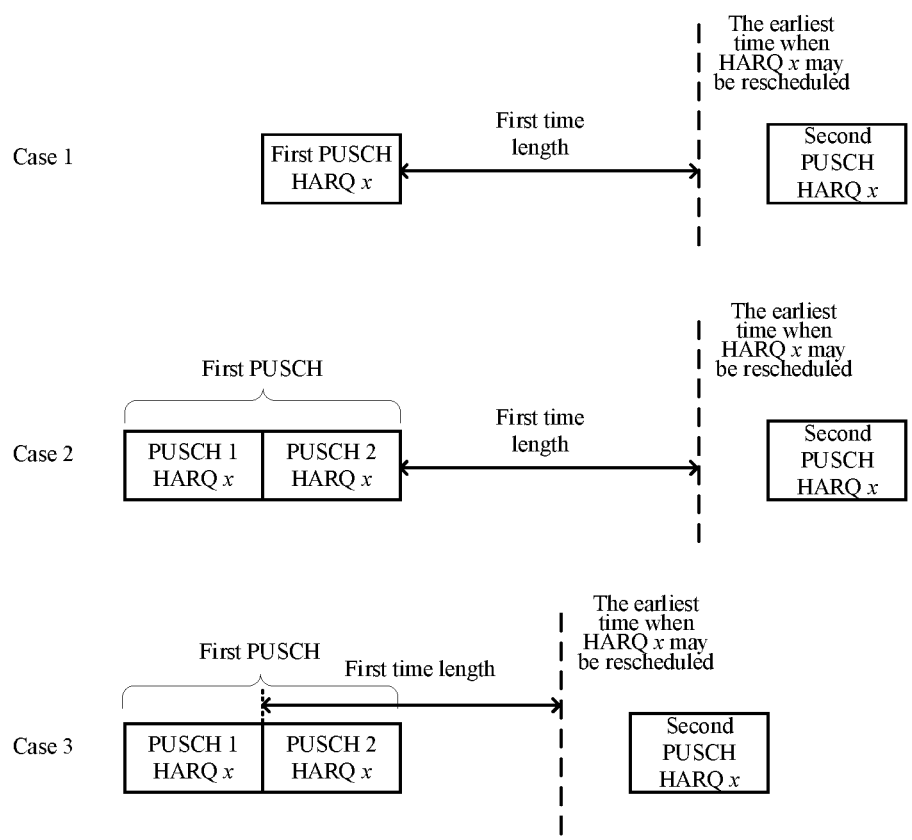
FIG. 6 is a schematic diagram of a case where an interval between two PUSCH transmissions needs to meet a first time length according to an implementation of the present disclosure.

For example, a terminal device receives a first PDCCH, the first PDCCH is used for scheduling the terminal device to transmit a first PUSCH using HARQ x, as in case 1 in FIG. 6, after a first time length after a last symbol transmitted by the first PUSCH, it is the earliest time when HARQ x may be rescheduled, that is to say, in a case where the terminal device is scheduled to transmit a second PUSCH using the HARQ x after the first time length after the last symbol transmitted by the first PUSCH, the terminal device transmits the second PUSCH.

For another example, a terminal device receives first PDCCHs, the first PDCCH is used for scheduling the terminal device to transmit first PUSCHs using HARQ x, the first PUSCHs includes a PUSCH 1 and a PUSCH 2, as in case 2 in FIG. 6, after a first time length after a last symbol transmitted by the PUSCH 2 in the first PUSCHs (i.e., a last PUSCH in the first PUSCHs), it is the earliest time when HARQ x may be rescheduled, that is to say, in a case where the terminal device is scheduled to transmit a second PUSCH using the HARQ x after the first time length after the last symbol transmitted by the PUSCH 2 in the first PUSCHs, the terminal device transmits the second PUSCH.

For another example, a terminal device receives a first PDCCH, the first PDCCH is used for scheduling the terminal device to transmit first PUSCHs using HARQ x, the first PUSCHs includes a PUSCH 1 and a PUSCH 2, as in case 3 in FIG. 6, after a first time length after a last symbol transmitted by the PUSCH 1 in the first PUSCHs (i.e., a first PUSCH in the first PUSCHs), it is the earliest time when HARQ x may be rescheduled, that is to say, the terminal device transmits a second PUSCH in a case where the terminal device is scheduled to transmit the second PUSCH using the HARQ x after the first time length after the last symbol transmitted by the PUSCH 1 in the first PUSCHs.

Optionally, in some implementations, in a case where the terminal device is configured with Discontinuous Reception (DRX), the terminal device initiates a first timer after a last symbol transmitted by a target PUSCH in the first PUSCH, or the terminal device initiates a first timer after a last symbol transmitted by the first PDCCH.

Among them, the first timer is used for indicating a time window within which the terminal device does not expect to receive a second PDCCH, and the second PDCCH is used for scheduling the terminal device to transmit the second PUSCH using the first uplink HARQ process.

For example, the first timer is used for indicating a minimum time length within which the terminal device does not expect to receive the second PDCCH.

Or, the first timer is used for indicating a time window within which the terminal device does not expect to transmit a second PUSCH using the first uplink HARQ process.

For example, the first timer is used for indicating a minimum time length within which the terminal device does not expect to transmit a second PUSCH using the first uplink HARQ process.

Optionally, the first timer is a DRX uplink HARQ RTT timer (drx-HARQ-RTT-TimerUL).

Optionally, the first timer corresponds to the first time length. For example, a time length of the first timer is less than or equal to the first time length.

Optionally, the terminal device starts a second timer after the first timer expires, and the second timer is used for indicating a time window within which the terminal device is possible to receive the second PDCCH.

For example, the second timer is used for indicating a maximum time length within which the terminal device is possible to receive the second PDCCH.

Optionally, the second timer is used for indicating a time window within which the terminal device is possible to transmit a second PUSCH using the first uplink HARQ process.

For example, the second timer is used for indicating a maximum time length within which the terminal device is possible to transmit a second PUSCH using the first uplink HARQ process.

Optionally, the second timer is a DRX uplink retransmission timer (drx-RetransmissionTimerUL).

Figure 7:
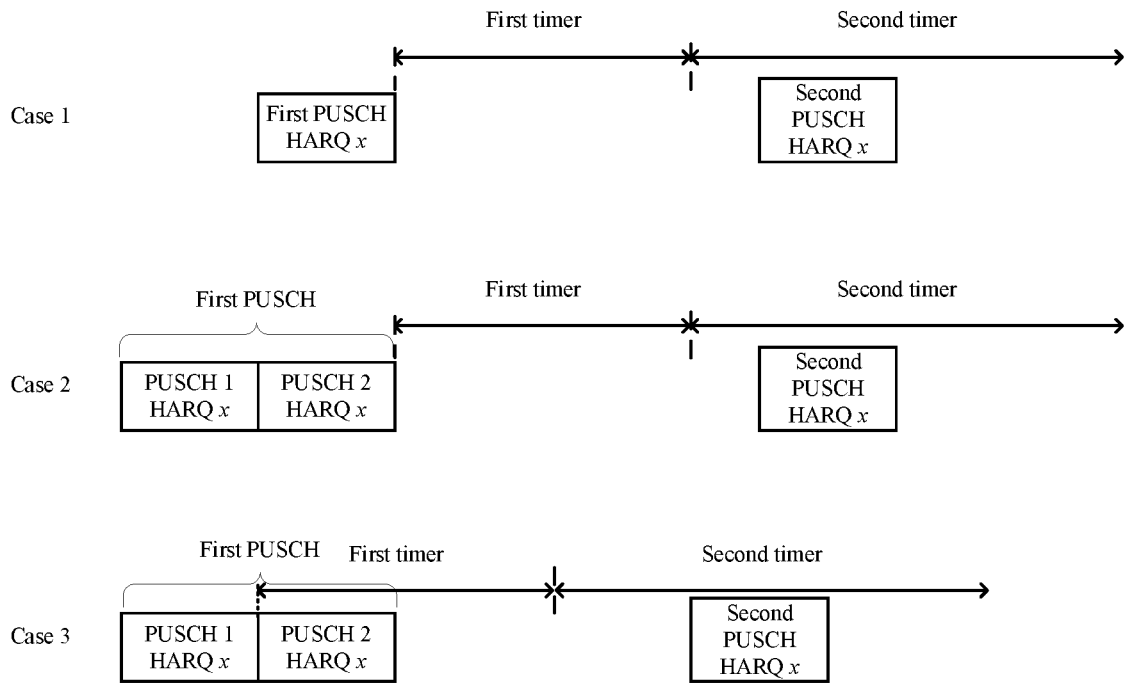
FIG. 7 is a schematic diagram of a first timer and a second timer according to an implementation of the present disclosure.

For example, in a case where a terminal device is configured with DRX, the terminal device receives a first PDCCH, the first PDCCH is used for scheduling the terminal device to transmit a first PUSCH using HARQ x, as in case 1 in FIG. 7, the terminal device starts the first timer after a last symbol transmitted by the first PUSCH, and starts the second timer after the first timer expires. In addition, the terminal device transmits a second PUSCH using HARQ x during operation of the second timer.

For another example, in a case where a terminal device is configured with DRX, the terminal device receives a first PDCCH, the first PDCCH is used for scheduling the terminal device to transmit first PUSCHs using HARQ x, the first PUSCHs include a PUSCH 1 and a PUSCH 2, as in case 2 in FIG. 7, the terminal device starts the first timer after a last symbol transmitted by the PUSCH 2 in the first PUSCHs (a last PUSCH in the first PUSCHs), and starts the second timer after the first timer expires. In addition, the terminal device transmits a second PUSCH using HARQ x during operation of the second timer.

For another example, in a case where a terminal device is configured with DRX, the terminal device receives a first PDCCH, the first PDCCH is used for scheduling the terminal device to transmit first PUSCHs using HARQ x, the first PUSCHs include a PUSCH 1 and a PUSCH 2, as in case 3 in FIG. 7, the terminal device starts the first timer after a last symbol transmitted by the PUSCH 1 in the first PUSCHs (a first PUSCH in the first PUSCHs), and starts the second timer after the first timer expires. In addition, the terminal device transmits a second PUSCH using HARQ x during operation of the second timer.

For another example, in a case where a terminal device is configured with DRX, the terminal device receives a first PDCCH, the first PDCCH is used for scheduling the terminal device to transmit a first PUSCH using HARQ x, the terminal device starts the first timer after a last symbol transmitted by the first PDCCH, and starts the second timer after the first timer expires. In addition, during operation of the second timer, the terminal device receives a second PDCCH used for scheduling the terminal device to transmit a second PUSCH using the HARQ x, or the terminal device transmits a second PUSCH using the HARQ x.

Optionally, in other implementations, in the S210, the time interval between two adjacent PUSCH transmissions corresponding to the first uplink HARQ process is greater than or equal to the first time length, which may specifically include at least one of Examples 4 and 5 below.

Example 4, the terminal device receives a first PDCCH, wherein uplink authorization information carried in the first PDCCH is used for scheduling the terminal device to transmit a first PUSCH carrying a first TB using the first uplink HARQ process; the terminal device ignores the first PDCCH or does not transmit the first PUSCH in a case where an interval between an end position of a target symbol and a start position of a first uplink symbol of the first PUSCH with an influence of a timing advance having been considered is less than a second time length.

Example 5, the terminal device receives a first PDCCH, wherein uplink authorization information carried in the first PDCCH is used for scheduling the terminal device to transmit a first PUSCH carrying a first TB using the first uplink HARQ process; the terminal device transmits the first PUSCH in a case where an interval between an end position of a target symbol and a start position of a first uplink symbol of the first PUSCH with an influence of a timing advance having been considered is greater than or equal to the second time length.

Among them, a PUSCH transmitted last time using the first uplink HARQ process is a third PUSCH, and the third PUSCH includes at least one PUSCH; the target symbol is a later symbol of a last symbol of the first PDCCH and a last uplink symbol of a last PUSCH in the third PUSCH with a timing advance having been considered, or the target symbol is a later symbol of a last symbol of the first PDCCH and a last uplink symbol of a first PUSCH in the third PUSCH with a timing advance having been considered.

Optionally in Examples 4 and 5, the second time length is determined according to a processing time $T_{proc,2}$, wherein $T_{proc,2}$ is determined according to a PUSCH preparation time value N2.

Figure 8:
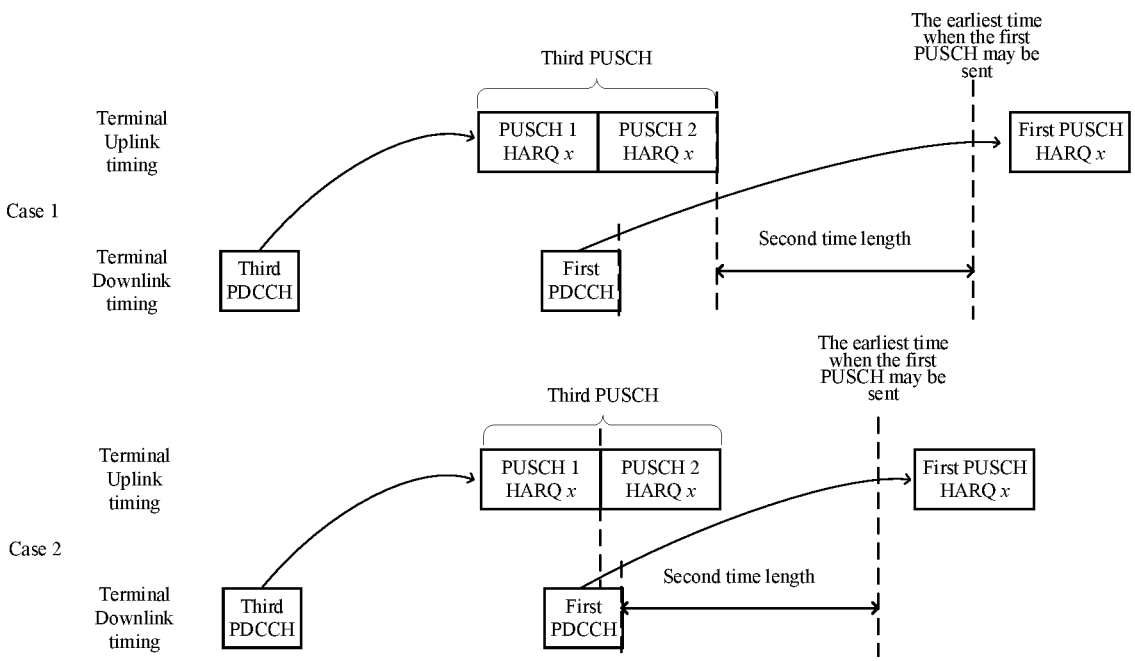
FIG. 8 is a schematic diagram of a case where an interval between two PUSCH transmissions needs to meet a second time length according to an implementation of the present disclosure.

For example, a terminal device receives a first PDCCH, wherein first DCI carried in the first PDCCH is used for scheduling the terminal device to transmit a first PUSCH carrying a first TB using HARQ x; a PUSCH transmitted last time using the HARQ x is a third PUSCH, the third PUSCHs include a PUSCH 1 and a PUSCH 2, the third PUSCHs are scheduled by third DCI carried in a third PDCCH for transmission; as in case 1 in FIG. 8, a later symbol of a last symbol of a first PDCCH and a last uplink symbol of the PUSCH 2 (a last PUSCH in the third PUSCHs) with a timing advance having been considered is a last uplink symbol of the PUSCH 2 (i.e., a target symbol), then after a second time length after the last symbol transmitted by the PUSCH 2, it is the earliest time when the first PUSCH may be sent.

For another example, a terminal device receives a first PDCCH, wherein first DCI carried in the first PDCCH is used for scheduling the terminal device to transmit a first PUSCH carrying a first TB using HARQ x; PUSCHs transmitted last time using the HARQ x are third PUSCHs, the third PUSCHs include a PUSCH 1 and a PUSCH 2, the third PUSCHs are scheduled for transmission by third DCI carried in a third PDCCH; as in case 2 in FIG. 8, a later symbol of a last symbol of a first PDCCH and a last uplink symbol of the PUSCH 1 (a first PUSCH in the third PUSCHs) with a timing advance having been considered is a last symbol of the first PDCCH (i.e., a target symbol), then after a second time length after the last symbol transmitted by the first PDCCH, it is the earliest time when the first PUSCH may be sent.

It should be noted that the HARQ x is a specific example of the first uplink HARQ process and this does not constitute a limitation on the present disclosure.

Optionally, in an implementation of the present disclosure, the first time length may be determined according to at least one of following: a PUSCH preparation time value; a processing time $T_{proc,2}$, wherein $T_{proc,2}$ is determined according to a PUSCH preparation time value; a processing time value of receiving a PUSCH by a network device; a larger value of a PUSCH preparation time value and a processing time value of receiving a PUSCH by a network device; and a smaller value of a PUSCH preparation time value and a processing time value of receiving a PUSCH by a network device.

It should be noted that the PUSCH preparation time value such as N2 may be a PUSCH preparation time value of a terminal device. In addition, a value of N2 corresponding to a processing capability 1 of a UE is different from a value of N2 corresponding to a processing capability 2 of the UE.

Optionally, the first time length and the second time length are equal.

Optionally, the second time length is greater than the first time length.

Optionally, the PUSCH preparation time value N2 is related to a subcarrier spacing configuration of a PUSCH, or the PUSCH preparation time value N2 is related to a subcarrier spacing configuration of a PDCCH scheduling a PUSCH. For example, values of N2 under different subcarrier spacings are different.

For example, if a UE receives uplink authorization information from a base station, the uplink authorization information is used for scheduling the UE to send a target PUSCH which carries a target transport block and a DMRS and corresponds to a first uplink HARQ process, if the UE determines a start position of a first uplink symbol of the target PUSCH with an influence of a timing advance having been considered according to the uplink authorization information, for example, according to a SLIV indication in the uplink authorization information, if the start position of the first uplink symbol is not earlier than a symbol L2, the UE should transmit the target transport block; otherwise, the UE ignores the scheduling DCI.

Among them, the symbol L2 is defined as a next uplink symbol after an end position of a later symbol of a last symbol of a PDCCH carrying the uplink authorization information and a last symbol of last PUSCH transmission corresponding to the first uplink HARQ process, wherein a start position of a CP of the next uplink symbol is later than a processing time $T_{proc,2}$.

Optionally, $T_{proc,2}$ may be determined according to the above equation 1.

It should be noted that meanings of various parameters in the equation 1 may refer to definitions in Section 6.4 of the Communication Protocol Standard TS38.214, which is not discussed here for simplicity. In addition, the meanings of various parameters in the equation 1 may be modified or updated in different communication protocol standards, and the present disclosure may be adjusted according to a corresponding communication protocol.

It should be noted that in an implementation of the present disclosure, at least one PUSCH included in the first PUSCH may be used for transmitting a first TB. At least one PUSCH included in the second PUSCH may be used for transmitting a second TB. At least one PUSCH included in the third PUSCH may be used for transmitting a third TB. In addition, in an implementation of the present disclosure, the first PUSCH corresponds to a kth PUSCH transmission, the second PUSCH corresponds to a (k+1)th PUSCH transmission, and the third PUSCH corresponds to a (k−1)th PUSCH transmission.

Therefore, in an implementation of the present disclosure, in a case where a first uplink HARQ process corresponds to a first state, a time interval between two adjacent PUSCH transmissions corresponding to the first uplink HARQ process is greater than or equal to a first time length. Thereby, uplink HARQ scheduling restrictions are enhanced, and it is ensured that a problem of out of order of a processing timing of a terminal device will not occur.

The implementation of the channel transmission method 200 of the present disclosure is described in detail from a terminal side with reference to FIGS. 5 to 8 above, and an implementation of a channel transmission method 300 of the present disclosure is described in detail from a network side with reference to FIG. 9 below. It should be understood that the implementation of the channel transmission method 300 and the implementation of the channel transmission method 200 correspond to each other, and similar description may refer to the implementation of the channel transmission method 200.

Figure 9:
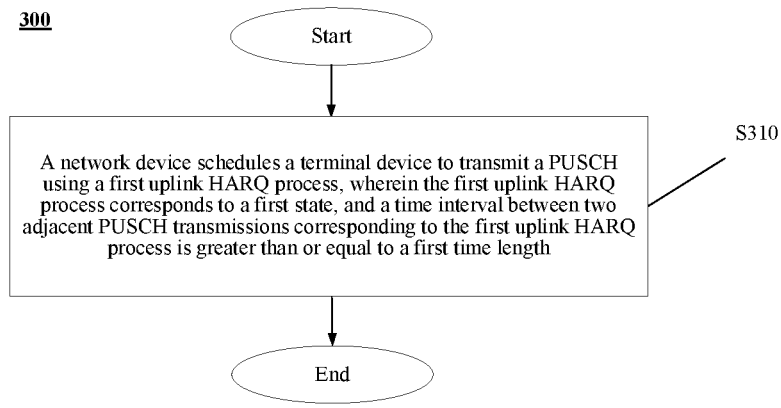
FIG. 9 is a schematic flowchart of another channel transmission method according to an implementation of the present disclosure.

FIG. 9 is a schematic flowchart of a channel transmission method 300 according to an implementation of the present disclosure. As shown in FIG. 9, the method 300 may include at least part of following contents.

In S310, a network device schedules a terminal device to transmit a PUSCH using a first uplink HARQ process, wherein the first uplink HARQ process corresponds to a first state, and a time interval between two adjacent PUSCH transmissions corresponding to the first uplink HARQ process is greater than or equal to a first time length.

That is, a time interval between an nth PUSCH transmission and an (n−1)th PUSCH transmission corresponding to the first uplink HARQ process is greater than or equal to the first time length, n is a positive integer, and n is greater than or equal to 2.

Optionally, the first uplink HARQ process corresponds to the first state, including: the first uplink HARQ process is a disabled HARQ process; or, the first uplink HARQ process is configured with a disabling parameter.

Optionally, in some implementations, in the S310, the time interval between two adjacent PUSCH transmissions corresponding to the first uplink HARQ process is greater than or equal to the first time length, which may specifically include at least one of Examples 1 to 3 below.

Example 1, the network device sends a first PDCCH to the terminal device, the first PDCCH is used for scheduling the terminal device to transmit a first PUSCH using the first uplink HARQ process, wherein the first PUSCH includes at least one PUSCH; and the network device does not schedule the terminal device to transmit a second PUSCH using the first uplink HARQ process within the first time length after a last symbol transmitted by a target PUSCH in the first PUSCH.

Example 2, the network device sends a first PDCCH to the terminal device, the first PDCCH is used for scheduling the terminal device to transmit a first PUSCH using the first uplink HARQ process, wherein the first PUSCH includes at least one PUSCH; and the network device does not expect to receive a second PUSCH sent by the terminal device in a case where the terminal device is scheduled to transmit the second PUSCH using the first uplink HARQ process within the first time length after a last symbol transmitted by a target PUSCH in the first PUSCH.

Example 3, the network device sends a first PDCCH to the terminal device, the first PDCCH is used for scheduling the terminal device to transmit a first PUSCH using the first uplink HARQ process, wherein the first PUSCH includes at least one PUSCH; and the network device receives a second PUSCH sent by the terminal device in a case where the terminal device is scheduled to transmit the second PUSCH using the first uplink HARQ process after the first time length after a last symbol transmitted by a target PUSCH in the first PUSCH.

Optionally, in some implementations, the network device sends first configuration information to the terminal device, wherein in a case where the terminal device is configured with Discontinuous Reception (DRX), the first configuration information is used for configuring the terminal device to start a first timer after the last symbol transmitted by the target PUSCH in the first PUSCH, or the first configuration information is used for configuring the terminal device to start a first timer after a last symbol transmitted by the first PDCCH; wherein the first timer is used for indicating a time window within which the terminal device does not expect to receive a second PDCCH, and the second PDCCH is used for scheduling the terminal device to transmit a second PUSCH using the first uplink HARQ process. Or, the first timer is used for indicating a time window within which the terminal device does not expect to transmit a second PUSCH using the first uplink HARQ process.

Optionally, in some implementations, the network device sends second configuration information to the terminal device, wherein the second configuration information is used for configuring the terminal device to start a second timer after the first timer expires, and the second timer is used for indicating a time window within which the terminal device is possible to receive the second PDCCH. Optionally, the second timer is used for indicating a time window within which the terminal device is possible to transmit a second PUSCH using the first uplink HARQ process.

Optionally, the second timer is a DRX uplink retransmission timer (drx-RetransmissionTimerUL).

Optionally, the second configuration information includes the second timer.

Optionally, a time length of the first timer is less than or equal to the first time length.

Optionally, the first timer is a DRX uplink HARQ RTT timer (drx-HARQ-RTT-TimerUL).

Optionally, the first configuration information includes the first timer.

Optionally, the target PUSCH is a first PUSCH in the first PUSCH; or, the target PUSCH is a last PUSCH in the first PUSCH.

Optionally, the first PUSCHs include at least two PUSCHs, wherein the at least two PUSCHs are continuous in a time domain, or the at least two PUSCHs occupy at least two continuous time slots in a time domain.

Optionally, the first PUSCH is scheduled through one PDCCH, or the first PUSCH corresponds to one PDCCH.

Optionally, the first PUSCH is a PUSCH scheduled by a PDCCH, or the first PUSCH is a SPS PUSCH, or the first PUSCH is a CG PUSCH.

Optionally, in other implementations, in the S310, the time interval between two adjacent PUSCH transmissions corresponding to the first uplink HARQ process is greater than or equal to the first time length, which may specifically include at least one of Examples 4 and 5 below.

Example 4, the network device sends a first PDCCH to the terminal device, wherein uplink authorization information carried in the first PDCCH is used for scheduling the terminal device to transmit a first PUSCH carrying a first transport block (TB) using the first uplink HARQ process; and the network device does not expect the terminal device to transmit the first PUSCH in a case where an interval between an end position of a target symbol and a start position of a first uplink symbol of the first PUSCH with an influence of a timing advance having been considered is less than a second time length.

Example 5, the network device sends a first PDCCH to the terminal device, wherein uplink authorization information carried in the first PDCCH is used for scheduling the terminal device to transmit a first PUSCH carrying a first transport block (TB) using the first uplink HARQ process; and the network device receives the first PUSCH sent by the terminal device in a case where an interval between an end position of a target symbol and a start position of a first uplink symbol of the first PUSCH with an influence of a timing advance having been considered is greater than or equal to the second time length.

Among them, a PUSCH transmitted last time using the first uplink HARQ process is a third PUSCH, and the third PUSCH includes at least one PUSCH; the target symbol is a later symbol of a last symbol of the first PDCCH and a last uplink symbol of a last PUSCH in the third PUSCH with a timing advance having been considered, or the target symbol is a later symbol of a last symbol of the first PDCCH and a last uplink symbol of a first PUSCH in the third PUSCH with a timing advance having been considered.

Optionally, the second time length is determined according to a processing time $T_{proc,2}$, wherein $T_{proc,2}$ is determined according to a PUSCH preparation time value.

Optionally, in an implementation of the present disclosure, the first time length may be determined according to at least one of following: a PUSCH preparation time value; a processing time $T_{proc,2}$, wherein $T_{proc,2}$ is determined according to a PUSCH preparation time value; a processing time value of receiving a PUSCH by a network device; a larger value of a PUSCH preparation time value and a processing time value of receiving a PUSCH by a network device; and a smaller value of a PUSCH preparation time value and a processing time value of receiving a PUSCH by a network device.

It should be noted that the PUSCH preparation time value N2 may be a PUSCH preparation time value of a terminal device. In addition, a value of N2 corresponding to a processing capability 1 of a UE is different from a value of N2 corresponding to a processing capability 2 of the UE.

Optionally, the first time length and the second time length are equal.

Optionally, the second time length is greater than the first time length.

Optionally, the PUSCH preparation time value N2 is related to a subcarrier spacing configuration of a PUSCH, or the PUSCH preparation time value N2 is related to a subcarrier spacing configuration of a PDCCH scheduling a PUSCH. For example, values of N2 under different subcarrier spacings are different.

For example, if a UE receives uplink authorization information from a base station, the uplink authorization information is used for scheduling the UE to send a target PUSCH which carries a target transport block and a DMRS and corresponds to a first uplink HARQ process, if the UE determines a start position of a first uplink symbol of the target PUSCH with an influence of a timing advance having been considered according to the uplink authorization information, for example, according to a SLIV indication in the uplink authorization information, if the start position of the first uplink symbol is not earlier than a symbol L2, the UE should transmit the target transport block; otherwise, the UE ignores the scheduling DCI.

Among them, the symbol L2 is defined as a next uplink symbol after an end position of a later symbol of a last symbol of a PDCCH carrying the uplink authorization information and a last symbol of last PUSCH transmission corresponding to the first uplink HARQ process, wherein a start position of a CP of the next uplink symbol is later than a processing time $T_{proc,2}$.

Optionally, $T_{proc,2}$ may be determined according to the above equation 1.

It should be noted that meanings of various parameters in the equation 1 may refer to definitions in Section 6.4 of the Communication Protocol Standard TS38.214, which is not discussed here for simplicity. In addition, the meanings of various parameters in the equation 1 may be modified or updated in different communication protocol standards, and the present disclosure may be adjusted according to a corresponding communication protocol.

It should be noted that in an implementation of the present disclosure, at least one PUSCH included in the first PUSCH may be used for transmitting a first TB. At least one PUSCH included in the second PUSCH may be used for transmitting a second TB. At least one PUSCH included in the third PUSCH may be used for transmitting a third TB. In addition, in an implementation of the present disclosure, the first PUSCH corresponds to a kth PUSCH transmission, the second PUSCH corresponds to a (k+1)th PUSCH transmission, and the third PUSCH corresponds to a (k−1)th PUSCH transmission.

Therefore, in an implementation of the present disclosure, in a case where a first uplink HARQ process corresponds to a first state, a time interval between two adjacent PUSCH transmissions corresponding to the first uplink HARQ process is greater than or equal to a first time length. Thereby, uplink HARQ scheduling restrictions are enhanced, and it is ensured that a problem of out of order of a processing timing of a terminal device will not occur.

Figure 10:
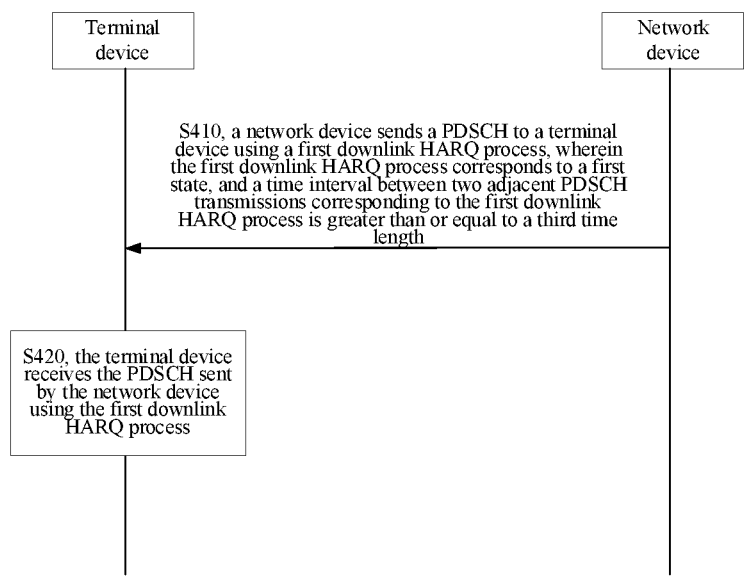
FIG. 10 is a schematic flowchart of yet another channel transmission method according to an implementation of the present disclosure.

FIG. 10 is a schematic flowchart of a channel transmission method 400 according to an implementation of the present disclosure. As shown in FIG. 10, the method 400 may include at least part of following contents.

In S410, a network device sends a PDSCH to a terminal device using a first downlink HARQ process, wherein the first downlink HARQ process corresponds to a first state, and a time interval between two adjacent PDSCH transmissions corresponding to the first downlink HARQ process is greater than or equal to a third time length; and in S420, the terminal device receives the PDSCH sent by the network device using the first downlink HARQ process.

That is, a time interval between an nth PDSCH transmission and an (n−1)th PDSCH transmission corresponding to the first downlink HARQ process is greater than or equal to the third time length, n is a positive integer, and n is greater than or equal to 2.

Optionally, the first downlink HARQ process corresponds to the first state, including: the first downlink HARQ process is a disabled HARQ process; or, the first downlink HARQ process is configured with a disabling parameter; or the first downlink HARQ process does not correspond to an uplink HARQ-ACK feedback.

It should be noted that for a first downlink HARQ process corresponding to a disabled state, the network device does not need to receive HARQ-ACK information corresponding to a TB 1 transmitted in the first downlink HARQ process, that is, it may reuse the first downlink HARQ process to transmit a TB 2. Among them, the TB 1 and the TB 2 may be the same TBs or different TBs. However, when the network device reuses the first downlink HARQ process to transmit the TB 2, it is necessary to ensure that a time interval between a PDSCH 1 transmitting the TB 1 and a PDSCH 2 transmitting the TB 2 is greater than or equal to the third time length, so as to ensure that the terminal device may have enough time to receive the PDSCH 1 when receiving the PDSCH 2.

Optionally, in some implementations, in the S410, the time interval between two adjacent PDSCH transmissions corresponding to the first downlink HARQ process is greater than or equal to the third time length, which may specifically include at least one of Examples 1 to 3 below.

Example 1, the terminal device receives a first PDSCH sent by the network device using the first downlink HARQ process, wherein the first PDSCH includes at least one PDSCH; and the terminal device does not expect to receive or decode a second PDSCH sent by the network device using the first downlink HARQ process within the third time length after a last symbol transmitted by a target PDSCH in the first PDSCH. Accordingly, the network device does not use the first downlink HARQ process to send the second PDSCH within the third time length after the last symbol transmitted by the target PDSCH in the first PDSCH.

Example 2, the terminal device receives a first PDSCH sent by the network device using the first downlink HARQ process, wherein the first PDSCH includes at least one PDSCH; and the terminal device does not receive or decode a second PDSCH in a case that the terminal device is scheduled to receive or decode the second PDSCH sent by the network device using the first downlink HARQ process within the third time length after a last symbol transmitted by a target PDSCH in the first PDSCH. Accordingly, in the case where the terminal device is scheduled to receive or decode the second PDSCH sent by the network device using the first downlink HARQ process within the third time length after the last symbol transmitted by the target PDSCH in the first PDSCH, the network device assumes that the terminal device does not receive or decode the second PDSCH.

Example 3, the terminal device receives a first PDSCH sent by the network device using the first downlink HARQ process, wherein the first PDSCH includes at least one PDSCH; and the terminal device receives or decodes a second PDSCH in a case that the terminal device is scheduled to receive or decode the second PDSCH sent by the network device using the first downlink HARQ process after the third time length after a last symbol transmitted by a target PDSCH in the first PDSCH. Accordingly, in the case where the terminal device is scheduled to receive or decode the second PDSCH sent by the network device using the first downlink HARQ process after the third time length after the last symbol transmitted by the target PDSCH in the first PDSCH, the network device assumes that the terminal device receives or decodes the second PDSCH.

Optionally, the target PDSCH is a first PDSCH in the first PDSCH; or, the target PDSCH is a last PDSCH in the first PDSCH.

Figure 11:
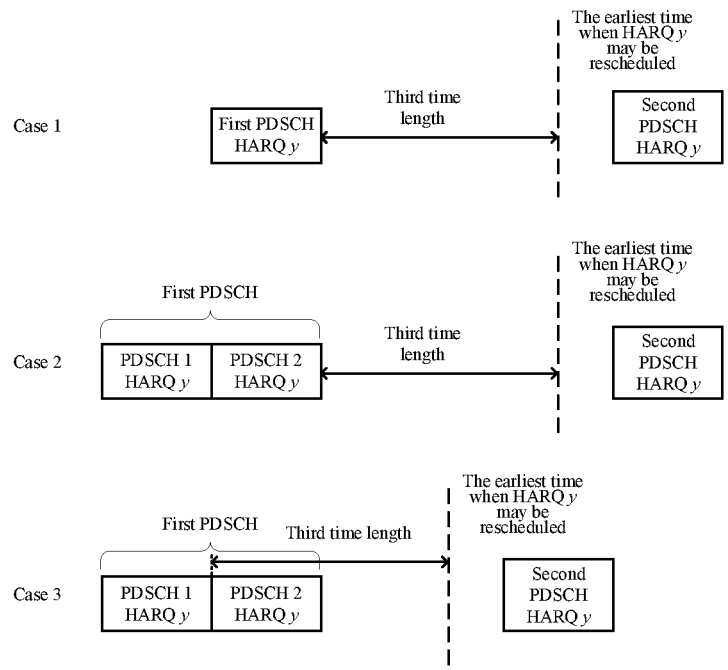
FIG. 11 is a schematic diagram of a case where an interval between two PDSCH transmissions needs to meet a third time length according to an implementation of the present disclosure.

For example, a terminal device receives a first PDSCH sent by a network device using HARQ y, as in case 1 in FIG. 11, after a third time length after a last symbol transmitted by the first PDSCH, it is the earliest time when the HARQ y may be rescheduled, that is to say, the terminal device receives or decodes a second PDSCH in a case where the terminal device is scheduled to receive or decode, after a third time length after a last symbol transmitted by the first PDSCH, the second PDSCH sent by the network device using the HARQ y.

For another example, a terminal device receives a first PDSCH sent by a network device using HARQ y, the first PDSCHs includes a PDSCH 1 and a PDSCH 2, as in case 2 in FIG. 11, after a third time length after a last symbol transmitted by the PDSCH 2 (a last PDSCH in the first PDSCH) in the first PDSCH, it is the earliest time when the HARQ y may be rescheduled, that is to say, the terminal device receives or decodes a second PDSCH in a case where the terminal device is scheduled to receive or decode, after the third time length after the last symbol transmitted by the PDSCH 2 in the first PDSCH, the second PDSCH sent by the network device using the HARQ y.

For another example, a terminal device receives a first PDSCH sent by a network device using HARQ y, the first PDSCHs include a PDSCH 1 and a PDSCH 2, as in case 3 in FIG. 11, after a third time length after a last symbol transmitted by the PDSCH 1 (a first PDSCH in the first PDSCHs) in the first PDSCH, it is the earliest time when the HARQ y may be rescheduled, that is to say, the terminal device receives or decodes a second PDSCH in a case where the terminal device is scheduled to receive or decode, after the third time length after the last symbol transmitted by the PDSCH 1 in the first PDSCHs, the second PDSCH sent by the network device using the HARQ y.

Optionally, in other implementations, in the S410, the time interval between two adjacent PDSCH transmissions corresponding to the first downlink HARQ process is greater than or equal to the third time length, which may specifically include at least one of Examples 4 to 6 below.

Example 4, the terminal device receives a first PDSCH sent by the network device using the first downlink HARQ process, wherein the first PDSCH includes at least one PDSCH; and the terminal device does not expect to receive a second PDCCH for the network device scheduling the first downlink HARQ process to transmit a second PDSCH within the third time length after a last symbol transmitted by a target PDSCH in the first PDSCH. Accordingly, the network device does not send the second PDCCH for scheduling the first downlink HARQ process to transmit the second PDSCH within the third time length after the last symbol transmitted by the target PDSCH in the first PDSCH.

Example 5, the terminal device receives a first PDSCH sent by the network device using the first downlink HARQ process, wherein the first PDSCH includes at least one PDSCH; and the terminal device does not receive or decode a second PDSCH in a case where the terminal device receives a second PDCCH for the network device scheduling the first downlink HARQ process to transmit the second PDSCH within the third time length after a last symbol transmitted by a target PDSCH in the first PDSCH. Accordingly, in the case where the terminal device receives the second PDCCH for the network device scheduling the first downlink HARQ process to transmit the second PDSCH within the third time length after the last symbol transmitted by the target PDSCH in the first PDSCH, the network device assumes that the terminal device does not receive or decode the second PDSCH.

Example 6, the terminal device receives a first PDSCH sent by the network device using the first downlink HARQ process, wherein the first PDSCH includes at least one PDSCH; and the terminal device receives or decodes a second PDSCH in a case where the terminal device receives a second PDCCH for the network device scheduling the first downlink HARQ process to transmit the second PDSCH after the third time length after a last symbol transmitted by a target PDSCH in the first PDSCH. Accordingly, in the case where the terminal device receives the second PDCCH for the network device scheduling the first downlink HARQ process to transmit the second PDSCH after the third time length after the last symbol transmitted by the target PDSCH in the first PDSCH, the network device assumes that the terminal device receives or decodes the second PDSCH.

Optionally, the target PDSCH is a first PDSCH in the first PDSCH; or, the target PDSCH is a last PDSCH in the first PDSCH.

Figure 12:
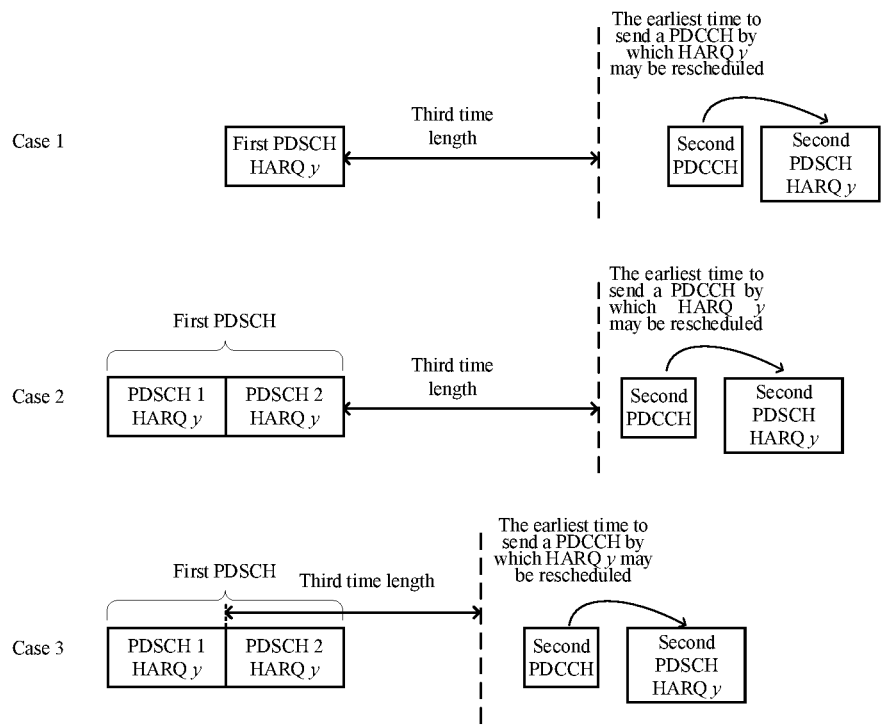
FIG. 12 is a schematic diagram of another case where an interval between two PDSCH transmissions needs to meet a third time length according to an implementation of the present disclosure.

For example, a terminal device receives a first PDSCH sent by a network device using HARQ y, as in case 1 in FIG. 12, after a third time length after a last symbol transmitted by the first PDSCH, it is the earliest time to send a PDCCH by which the HARQ y may be rescheduled, that is to say, the terminal device receives or decodes a second PDSCH in a case where the terminal device is scheduled to receive, after the third time length after the last symbol transmitted by the first PDSCH, a second PDCCH for the network device scheduling the HARQ y to transmit the second PDSCH.

For another example, a terminal device receives first PDSCHs sent by a network device using HARQ y, the first PDSCHs include a PDSCH 1 and a PDSCH 2, as in case 2 in FIG. 12, after a third time length after a last symbol transmitted by the PDSCH 2 (a last PDSCH in the first PDSCHs) in the first PDSCHs, it is the earliest time to send a PDCCH by which the HARQ y may be rescheduled, that is to say, the terminal device receives or decodes a second PDSCH in a case where the terminal device receives, after the third time length after the last symbol transmitted by the PDSCH 2 in the first PDSCHs, a second PDCCH for the network device scheduling the HARQ y to transmit the second PDSCH.

For another example, a terminal device receives first PDSCHs sent by a network device using HARQ y, the first PDSCHs include a PDSCH 1 and a PDSCH 2, as in case 3 in FIG. 12, after a third time length after a last symbol transmitted by the PDSCH 1 (a first PDSCH in the first PDSCHs) in the first PDSCHs, it is the earliest time to send a PDCCH by which the HARQ y may be rescheduled, that is to say, the terminal device receives or decodes a second PDSCH in a case where the terminal device receives, after the third time length after the last symbol transmitted by the PDSCH 1 in the first PDSCHs, a second PDCCH for the network device scheduling the HARQ y to transmit the second PDSCH.

Optionally, in some implementations, in a case where the terminal device is configured with DRX, the terminal device starts a third timer after a last symbol transmitted by a target PDSCH in the first PDSCH, wherein the third timer is used for indicating a time window within which the terminal device does not expect to receive a second PDCCH, or the third timer is used for indicating a time window within which the terminal device does not expect to receive a second PDSCH, and the second PDCCH is used for the network device to schedule the first downlink HARQ process to transmit the second PDSCH.

For example, the third timer is used for indicating a minimum time length within which the terminal device does not expect to receive a second PDCCH, or the third timer is used for indicating a minimum time length within which the terminal device does not expect to receive a second PDSCH.

Optionally, the terminal device starts a fourth timer after the third timer expires, and the fourth timer is used for indicating a time wind scheduled again ow within which the terminal device is possible to receive the second PDCCH or the second PDSCH.

For example, the fourth timer is used for indicating a maximum time length within which the terminal device is possible to receive the second PDCCH or the second PDSCH.

Optionally, the network device sends first configuration information to the terminal device, wherein in a case where the terminal device is configured with DRX, the first configuration information is used for configuring the terminal device to start a third timer after a last symbol transmitted by a target PDSCH in the first PDSCH, wherein the third timer is used for indicating a time window within which the terminal device does not expect to receive a second PDCCH, or the third timer is used for indicating a time window within which the terminal device does not expect to receive a second PDSCH, and the second PDCCH is used for the network device to schedule the first downlink HARQ process to transmit the second PDSCH.

Optionally, the network device sends second configuration information to the terminal device, wherein the second configuration information is used for configuring the terminal device to start a fourth timer after the third timer expires, and the fourth timer is used for indicating a time window within which the terminal device is possible to receive the second PDCCH or the second PDSCH.

Optionally, the fourth timer is a DRX downlink retransmission timer (drx-RetransmissionTimerDL).

Optionally, the second configuration information includes the fourth timer.

Optionally, a time length of the third timer is less than or equal to the third time length.

Optionally, the third timer is a DRX downlink HARQ RTT timer (drx-HARQ-RTT-TimerDL).

Optionally, the first configuration information includes the third timer.

Optionally, the target PDSCH is a first PDSCH in the first PDSCH; or, the target PDSCH is a last PDSCH in the first PDSCH.

Optionally, the first PDSCHs include at least two PDSCHs, and the at least two PDSCHs are continuous in a time domain, or the at least two PDSCHs occupy at least two continuous time slots in a time domain.

Optionally, the first PDSCH is scheduled through one PDCCH, or the first PDSCH corresponds to one PDCCH.

Optionally, the first PDSCH is a PDSCH scheduled by a PDCCH, or the first PDSCH is a SPS PDSCH.

Figure 13:
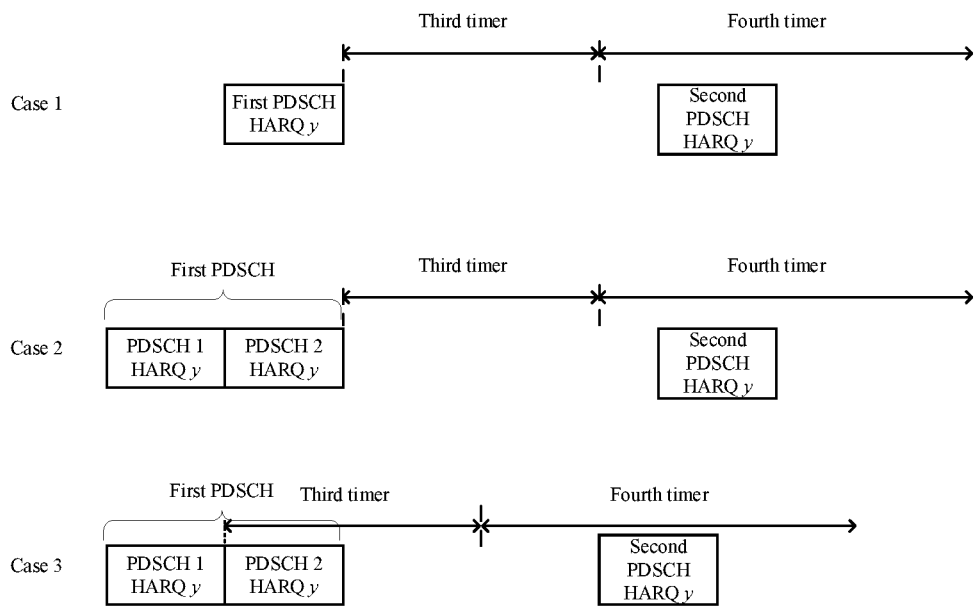
FIG. 13 is a schematic diagram of a third timer and a fourth timer according to an implementation of the present disclosure.

For example, in a case where a terminal device is configured with DRX, the terminal device receives a first PDSCH sent by a network device using HARQ y, as in case 1 in FIG. 13, the terminal device starts the third timer after a last symbol transmitted by the first PDSCH, and starts the fourth timer after the third timer expires. In addition, during operation of the fourth timer, the terminal device receives a second PDSCH sent by the network device using HARQ y, or the terminal device receives a second PDCCH sent by the network device for scheduling the HARQ y to transmit a second PDSCH.

For another example, in a case where a terminal device is configured with DRX, the terminal device receives first PDSCHs sent by the network device using HARQ y, the first PDSCHs include a PDSCH 1 and a PDSCH 2, as in case 2 in FIG. 13, the terminal device starts the third timer after a last symbol transmitted by the PDSCH 2 (a last PDSCH in the first PDSCHs) in the first PDSCHs, and starts the fourth timer after the third timer expires. In addition, during operation of the fourth timer, the terminal device receives a second PDSCH sent by the network device using HARQ y, or the terminal device receives a second PDCCH sent by the network device for scheduling the HARQ y to transmit a second PDSCH.

For another example, in a case where a terminal device is configured with DRX, the terminal device receives first PDSCHs sent by the network device using HARQ y, the first PDSCHs include a PDSCH 1 and a PDSCH 2, as in case 3 in FIG. 13, the terminal device starts the third timer after a last symbol transmitted by the PDSCH 1 (a first PDSCH in the first PDSCHs) in the first PDSCHs, and starts the fourth timer after the third timer expires. In addition, during operation of the fourth timer, the terminal device receives a second PDSCH sent by the network device using HARQ y, or the terminal device receives a second PDCCH sent by the network device for scheduling the HARQ y to transmit a second PDSCH.

It should be noted that the HARQ y is a specific example of the first downlink HARQ process but does not constitute a limitation on the present disclosure.

Optionally, in an implementation of the present disclosure, the third time length may be determined according to at least one of following: a PDSCH decoding time value; a processing time $T_{proc,1}$, wherein $T_{proc,1}$ is determined according to the PDSCH decoding time value; a value of $K_1$, or a time domain position of a PUCCH resource indicated by the value of $K_1$, wherein $K_1$ is indicated through an HARQ feedback timing indication information field in a DCI format, or $K_1$ is provided through an HARQ feedback timing set; a value of $K_{offset}$, or a time domain position of a PUCCH resource indicated by the value of $K_{offset}$, wherein the value of $K_{offset}$ is indicated by a network device through at least one of a system message, an RRC message, a Media Access Control Control Element (MAC CE), and DCI; a value of $K_1+K_{offset}$, or a time domain position of a PUCCH resource indicated by the value of $K_1+K_{offset}$, wherein the $K_1+K_{offset}$ is indicated through an HARQ feedback timing indication information field in a DCI format, or the $K_1+K_{offset}$ is provided through an HARQ feedback timing set; or, $K_1$ is indicated through an HARQ feedback timing indication information field in a DCI format, or $K_1$ is provided through an HARQ feedback timing set, and the value of $K_{offset}$ is indicated by a network device through at least one of a system message, an RRC message, a MAC CE, and DCI; a processing time of preparing to send a PDSCH by a network device; a larger value of a PDSCH decoding time value and a processing time value of preparing to send a PDSCH by a network device; and a smaller value of a PDSCH decoding time value and a processing time value of preparing to send a PDSCH by a network device.

Optionally, when multiple values are included in an HARQ feedback timing set, $K_1$ is indicated through an HARQ feedback timing indication information field in a DCI format; when one value is included in an HARQ feedback timing set, $K_1$ is provided through the HARQ feedback timing set, wherein a DCI format does not include an HARQ feedback timing indication information field.

Optionally, the third time length is determined according to a time domain position of a PUCCH resource, including: the third time length is determined according to a time domain position corresponding to a first symbol of a PUCCH resource; or, the third time length is determined according to a time domain position corresponding to a last symbol of a PUCCH resource.

For example, an end position of a third time length is determined according to a start position of a first symbol of a PUCCH resource.

For another example, an end position of a third time length is determined according to an end position of a last symbol of a PUCCH resource.

Optionally, the PDSCH decoding time value is related to a subcarrier spacing configuration of a PDSCH.

It should be noted that the PDSCH decoding time value such as N or N1 may be a PDSCH decoding time value of a terminal device. In addition, a PDSCH decoding time value corresponding to a processing capability 1 of a UE, such as a value of N1, and a PDSCH decoding time value corresponding to a processing capability 2 of the UE, such as a value of N1, may be different.

Optionally, $T_{proc,1}$ may be determined according to the above equation 2.

It should be noted that meanings of various parameters in the equation 2 may refer to definitions in Section 5.3 of the Communication Protocol Standard TS38.214, which is not discussed here for simplicity. In addition, the meanings of various parameters in the equation 2 may be modified or updated in different communication protocol standards, and the present disclosure may be adjusted according to a corresponding communication protocol.

By way of example and not limitation, a value of a third time length is related to a subcarrier spacing configuration μ of a PDSCH, the third time length is 13 symbols when μ=0, the third time length is 13 symbols when μ=1, the third time length is 20 symbols when μ=2, and the third time length is 24 symbols when μ=3.

Therefore, in an implementation of the present disclosure, in a case where a first downlink HARQ process corresponds to a first state, a time interval between two adjacent PDSCH transmissions corresponding to the first downlink HARQ process is greater than or equal to a third time length. Thereby, downlink HARQ scheduling restrictions are enhanced, and it is ensured that a problem of out of order of a processing timing of a terminal device will not occur.

Method implementations of the present disclosure are described in detail above in combination with FIGS. 5 to 13, and apparatus implementations of the present disclosure will be described in detail below in combination with FIGS. 14 to 20. It should be understood that the apparatus implementations and the method implementations correspond to each other, and similar descriptions may refer to the method implementations.

Figure 14:
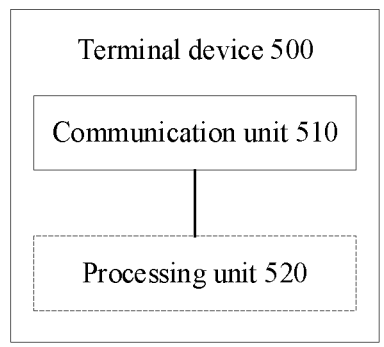
FIG. 14 is a schematic block diagram of a terminal device according to an implementation of the present disclosure.

FIG. 14 shows a schematic block diagram of a terminal device 500 according to an implementation of the present disclosure. As shown in FIG. 14, the terminal device 500 includes: a communication unit 510, configured to transmit a Physical Uplink Shared Channel (PUSCH) using a first uplink Hybrid Automatic Repeat reQuest (HARQ) process, wherein the first uplink HARQ process corresponds to a first state, and a time interval between two adjacent PUSCH transmissions corresponding to the first uplink HARQ process is greater than or equal to a first time length.

Optionally, the terminal device 500 further includes a processing unit 520.

The time interval between two adjacent PUSCH transmissions corresponding to the first uplink HARQ process is greater than or equal to the first time length, including: the communication unit 510 is further configured to receive a first Physical Downlink Control Channel (PDCCH), the first PDCCH is used for scheduling the terminal device to transmit a first PUSCH using the first uplink HARQ process, wherein the first PUSCH includes at least one PUSCH; the processing unit 520 is configured not to expect to be scheduled to transmit a second PUSCH using the first uplink HARQ process within the first time length after a last symbol transmitted by a target PUSCH in the first PUSCH; or, in a case where the terminal device is scheduled to transmit a second PUSCH using the first uplink HARQ process within the first time length after a last symbol transmitted by a target PUSCH in the first PUSCH, the communication unit 510 is further configured not to transmit the second PUSCH; or, in a case where the terminal device is scheduled to transmit a second PUSCH using the first uplink HARQ process after the first time length after a last symbol transmitted by a target PUSCH in the first PUSCH, the communication unit 510 is further configured to transmit the second PUSCH.

Optionally, in a case where the terminal device is configured with Discontinuous Reception (DRX), the communication unit 510 is further configured to start a first timer after a last symbol transmitted by a target PUSCH in the first PUSCH, or the processing unit 520 is further configured to start a first timer after a last symbol transmitted by the first PDCCH; wherein the first timer is used for indicating a time window within which the terminal device does not expect to receive a second PDCCH, and the second PDCCH is used for scheduling the terminal device to transmit a second PUSCH using the first uplink HARQ process.

Optionally, the processing unit 520 is further configured to start a second timer after the first timer expires, and the second timer is used for indicating a time window within which the terminal device is possible to receive the second PDCCH.

Optionally, the second timer is a DRX uplink retransmission timer.

Optionally, a time length of the first timer is less than or equal to the first time length.

Optionally, the first timer is a DRX uplink HARQ Round Trip Time (RTT) timer.

Optionally, the target PUSCH is a first PUSCH in the first PUSCH; or, the target PUSCH is a last PUSCH in the first PUSCH.

Optionally, the first PUSCHs include at least two PUSCHs, wherein the at least two PUSCHs are continuous in a time domain, or the at least two PUSCHs occupy at least two continuous time slots in a time domain.

Optionally, the first PUSCH is scheduled through one PDCCH, or the first PUSCH corresponds to one PDCCH.

Optionally, the first PUSCH is a PUSCH scheduled by a PDCCH, or the first PUSCH is a Semi-Persistent Scheduling (SPS) PUSCH, or the first PUSCH is a Configured Grant (CG) PUSCH.

Optionally, the time interval between two adjacent PUSCH transmissions corresponding to the first uplink HARQ process is greater than or equal to the first time length, including: the communication unit 510 is further configured to receive a first Physical Downlink Control Channel (PDCCH), wherein uplink authorization information carried in the first PDCCH is used for scheduling the terminal device to transmit a first PUSCH carrying a first Transport Block (TB) using the first uplink HARQ process; in a case where an interval between an end position of a target symbol and a start position of a first uplink symbol of the first PUSCH with an influence of a timing advance having been considered is less than a second time length, the processing unit 520 is further configured to ignore the first PDCCH, or the terminal device does not transmit the first PUSCH; or, in a case where an interval between an end position of a target symbol and a start position of a first uplink symbol of the first PUSCH with an influence of a timing advance having been considered is greater than or equal to the second time length, the communication unit 510 is further configured to transmit the first PUSCH; wherein a PUSCH transmitted last time using the first uplink HARQ process is a third PUSCH, and the third PUSCH includes at least one PUSCH; the target symbol is a later symbol of a last symbol of the first PDCCH and a last uplink symbol of a last PUSCH in the third PUSCH with a timing advance having been considered, or the target symbol is a later symbol of a last symbol of the first PDCCH and a last uplink symbol of a first PUSCH in the third PUSCH with a timing advance having been considered.

Optionally, the second time length is determined according to a processing time $T_{proc,2}$, wherein $T_{proc,2}$ is determined according to a PUSCH preparation time value.

Optionally, the first time length is determined according to a PUSCH preparation time value; or, the first time length is determined according to a processing time $T_{proc,2}$, wherein $T_{proc,2}$ is determined according to a PUSCH preparation time value; or, the first time length is determined according to a processing time value of receiving a PUSCH by a network device; or, the first time length is determined according to a larger value of a PUSCH preparation time value and a processing time value of receiving a PUSCH by a network device; or, the first time length is determined according to a smaller value of a PUSCH preparation time value and a processing time value of receiving a PUSCH by a network device.

Optionally, the PUSCH preparation time value is related to a subcarrier spacing configuration of a PUSCH, or the PUSCH preparation time value is related to a subcarrier spacing configuration of a Physical Downlink Control Channel (PDCCH) scheduling a PUSCH.

Optionally, the first uplink HARQ process corresponds to the first state, including: the first uplink HARQ process is a disabled HARQ process; or, the first uplink HARQ process is configured with a disabling parameter.

Optionally, in some implementations, the communication unit may be a communication interface or a transceiver, or an input/output interface of a communication chip or a system on a chip. The processing unit may be one or more processors.

It should be understood that the terminal device 500 in accordance with an implementation of the present disclosure may correspond to the terminal device in the method implementation of the present disclosure, and the above-mentioned and other operations and/or functions of various units in the terminal device 500 are respectively for implementing corresponding processes of the terminal device in the method 200 shown in FIG. 5, and will not be repeated herein for brevity.

Figure 15:
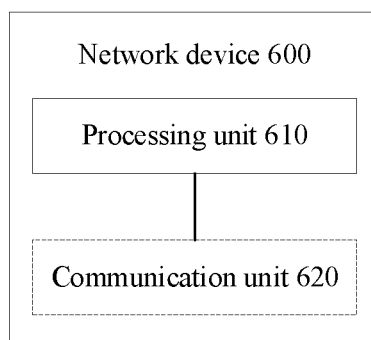
FIG. 15 is a schematic block diagram of a network device according to an implementation of the present disclosure.

FIG. 15 shows a schematic block diagram of a network device 600 according to an implementation of the present disclosure. As shown in FIG. 15, the network device 600 includes: a processing unit 610, configured to schedule a terminal device to transmit a Physical Uplink Shared Channel (PUSCH) using a first uplink Hybrid Automatic Repeat reQuest (HARQ) process, wherein the first uplink HARQ process corresponds to a first state, and a time interval between two adjacent PUSCH transmissions corresponding to the first uplink HARQ process is greater than or equal to a first time length.

Optionally, the network device 600 further includes a communication unit 620.

Optionally, the time interval between two adjacent PUSCH transmissions corresponding to the first uplink HARQ process is greater than or equal to the first time length, including: the communication unit 620 is configured to send a first Physical Downlink Control Channel (PDCCH) to the terminal device, and the first PDCCH is used for scheduling the terminal device to transmit a first PUSCH using the first uplink HARQ process, wherein the first PUSCH includes at least one PUSCH; the processing unit 610 is further configured not to schedule the terminal device to transmit a second PUSCH using the first uplink HARQ process within the first time length after a last symbol transmitted by a target PUSCH in the first PUSCH; or, in a case where the terminal device is scheduled to transmit a second PUSCH using the first uplink HARQ process within the first time length after a last symbol transmitted by a target PUSCH in the first PUSCH, the processing unit 610 is further configured not to expect to receive the second PUSCH transmitted by the terminal device; or, in a case where the terminal device is scheduled to transmit a second PUSCH using the first uplink HARQ process after the first time length after a last symbol transmitted by a target PUSCH in the first PUSCH, the communication unit 620 is further configured to receive the second PUSCH transmitted by the terminal device.

Optionally, the communication unit 620 is further configured to send first configuration information to the terminal device, wherein in a case where the terminal device is configured with Discontinuous Reception (DRX), the first configuration information is used for configuring the terminal device to start a first timer after a last symbol transmitted by a target PUSCH in the first PUSCH, or the first configuration information is used for configuring the terminal device to start a first timer after a last symbol transmitted by the first PDCCH; wherein the first timer is used for indicating a time window within which the terminal device does not expect to receive a second PDCCH, and the second PDCCH is used for scheduling the terminal device to transmit a second PUSCH using the first uplink HARQ process.

Optionally, the communication unit 620 is further configured to send second configuration information to the terminal device, wherein the second configuration information is used for configuring the terminal device to start a second timer after the first timer expires, and the second timer is used for indicating a time window within which the terminal device is possible to receive the second PDCCH.

Optionally, the second timer is a DRX uplink retransmission timer, and/or the second configuration information includes the second timer.

Optionally, a time length of the first timer is less than or equal to the first time length.

Optionally, the first timer is a DRX uplink HARQ Round Trip Time (RTT) timer, and/or the first configuration information includes the first timer.

Optionally, the target PUSCH is a first PUSCH in the first PUSCH; or, the target PUSCH is a last PUSCH in the first PUSCH.

Optionally, the first PUSCHs include at least two PUSCHs, wherein the at least two PUSCHs are continuous in a time domain, or the at least two PUSCHs occupy at least two continuous time slots in a time domain.

Optionally, the first PUSCH is scheduled through one PDCCH, or the first PUSCH corresponds to one PDCCH.

Optionally, the first PUSCH is a PUSCH scheduled by a PDCCH, or the first PUSCH is a Semi-Persistent Scheduling (SPS) PUSCH, or the first PUSCH is a Configured Grant (CG) PUSCH.

Optionally, the time interval between two adjacent PUSCH transmissions corresponding to the first uplink HARQ process is greater than or equal to the first time length, including: the communication unit 620 is further configured to send a first PDCCH to the terminal device, wherein uplink authorization information carried in the first PDCCH is used for scheduling the terminal device to transmit a first PUSCH carrying a first Transport Block (TB) using the first uplink HARQ process; in a case where an interval between an end position of a target symbol and a start position of a first uplink symbol of the first PUSCH with an influence of a timing advance having been considered is less than a second time length, the processing unit 610 is further configured not to expect the terminal device to transmit the first PUSCH; or, in a case where an interval between an end position of a target symbol and a start position of a first uplink symbol of the first PUSCH with an influence of a timing advance having been considered is greater than or equal to the second time length, the communication unit 620 is further configured to receive the first PUSCH sent by the terminal device; wherein a PUSCH transmitted last time using the first uplink HARQ process is a third PUSCH, and the third PUSCH includes at least one PUSCH; the target symbol is a later symbol of a last symbol of the first PDCCH and a last uplink symbol of a last PUSCH in the third PUSCH with a timing advance having been considered, or the target symbol is a later symbol of a last symbol of the first PDCCH and a last uplink symbol of a first PUSCH in the third PUSCH with a timing advance having been considered.

Optionally, the second time length is determined according to a processing time $T_{proc,2}$, wherein $T_{proc,2}$ is determined according to a PUSCH preparation time value.

Optionally, the first time length is determined according to a PUSCH preparation time value; or, the first time length is determined according to a processing time $T_{proc,2}$, wherein $T_{proc,2}$ is determined according to a PUSCH preparation time value; or, the first time length is determined according to a processing time value of receiving a PUSCH by a network device; or, the first time length is determined according to a larger value of a PUSCH preparation time value and a processing time value of receiving a PUSCH by a network device; or, the first time length is determined according to a smaller value of a PUSCH preparation time value and a processing time value of receiving a PUSCH by a network device.

Optionally, the PUSCH preparation time value is related to a subcarrier spacing configuration of a PUSCH, or the PUSCH preparation time value is related to a subcarrier spacing configuration of a Physical Downlink Control Channel (PDCCH) scheduling a PUSCH.

Optionally, the first uplink HARQ process corresponds to the first state, including: the first uplink HARQ process is a disabled HARQ process; or, the first uplink HARQ process is configured with a disabling parameter.

Optionally, in some implementations, the communication unit may be a communication interface or a transceiver, or an input/output interface of a communication chip or a system on a chip. The processing unit may be one or more processors.

It should be understood that the network device 600 in accordance with an implementation of the present disclosure may correspond to the network device in the method implementation of the present disclosure, and the above-mentioned and other operations and/or functions of various units in the network device 600 are respectively for implementing corresponding processes of the network device in the method 300 shown in FIG. 9, and will not be repeated herein for brevity.

Figure 16:
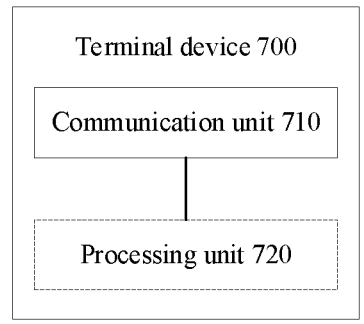
FIG. 16 is a schematic block diagram of another terminal device according to an implementation of the present disclosure.

FIG. 16 shows a schematic block diagram of a terminal device 700 according to an implementation of the present disclosure. As shown in FIG. 16, the terminal device 700 includes: a communication unit 710, configured to receive a Physical Downlink Shared Channel (PDSCH) sent by a network device using a first downlink Hybrid Automatic Repeat reQuest (HARQ) process, wherein the first downlink HARQ process corresponds to a first state, and a time interval between two adjacent PDSCH transmissions corresponding to the first downlink HARQ process is greater than or equal to a third time length.

Optionally, the terminal device 700 further includes a processing unit 720.

Optionally, the time interval between two adjacent PDSCH transmissions corresponding to the first downlink HARQ process is greater than or equal to the third time length, including: the communication unit 710 is further configured to receive a first PDSCH sent by the network device using the first downlink HARQ process, wherein the first PDSCH includes at least one PDSCH; the processing unit 720 is configured not to expect to receive or decode a second PDSCH sent by the network device using the first downlink HARQ process within the third time length after a last symbol transmitted by a target PDSCH in the first PDSCH; or, in a case where the terminal device is scheduled to receive or decode a second PDSCH sent by the network device using the first downlink HARQ process within the third time length after a last symbol transmitted by a target PDSCH in the first PDSCH, the communication unit 710 is configured not to receive or decode the second PDSCH; or, in a case where the terminal device is scheduled to receive or decode a second PDSCH sent by the network device using the first downlink HARQ process after the third time length after a last symbol transmitted by a target PDSCH in the first PDSCH, the communication unit 710 is configured to receive or decode the second PDSCH.

Optionally, the time interval between two adjacent PDSCH transmissions corresponding to the first downlink HARQ process is greater than or equal to the third time length, including: the communication unit 710 is further configured to receive a first PDSCH sent by the network device using the first downlink HARQ process, wherein the first PDSCH includes at least one PDSCH; the processing unit 720 is configured not to expect to receive a second PDCCH for the network device scheduling the first downlink HARQ process to transmit a second PDSCH within the third time length after a last symbol transmitted by a target PDSCH in the first PDSCH; or, in a case where the terminal device receives a second PDCCH for the network device scheduling the first downlink HARQ process to transmit a second PDSCH within the third time length after a last symbol transmitted by a target PDSCH in the first PDSCH, the communication unit is further configured not to receive or decode the second PDSCH; or, in a case where the terminal device receives a second PDCCH for the network device scheduling the first downlink HARQ process to transmit a second PDSCH after the third time length after a last symbol transmitted by a target PDSCH in the first PDSCH, the communication unit is further configured to receive or decode the second PDSCH.

Optionally, in a case where the terminal device is configured with Discontinuous Reception (DRX), the processing unit 720 is further configured to start a third timer after a last symbol transmitted by a target PDSCH in the first PDSCH, wherein the third timer is used for indicating a time window within which the terminal device does not expect to receive a second PDCCH, or the third timer is used for indicating a time window within which the terminal device does not expect to receive a second PDSCH, and the second PDCCH is used for the network device to schedule the first downlink HARQ process to transmit the second PDSCH.

Optionally, the processing unit 720 is further configured to start a fourth timer after the third timer expires, and the fourth timer is used for indicating a time window within which the terminal device is possible to receive the second PDCCH or the second PDSCH.

Optionally, the fourth timer is a DRX downlink retransmission timer.

Optionally, a time length of the third timer is less than or equal to the third time length.

Optionally, the third timer is a DRX downlink HARQ Round Trip Time (RTT) timer.

Optionally, the target PDSCH is a first PDSCH in the first PDSCH; or, the target PDSCH is a last PDSCH in the first PDSCH.

Optionally, the first PDSCHs include at least two PDSCHs, and the at least two PDSCHs are continuous in a time domain, or the at least two PDSCHs occupy at least two continuous time slots in a time domain.

Optionally, the first PDSCH is scheduled through one PDCCH, or the first PDSCH corresponds to one PDCCH.

Optionally, the first PDSCH is a PDSCH scheduled by a PDCCH, or the first PDSCH is a Semi-Persistent Scheduling (SPS) PDSCH.

Optionally, the third time length is determined according to a PDSCH decoding time value; or, the third time length is determined according to a processing time, $T_{proc,1}$ wherein $T_{proc,1}$ is determined according to a PDSCH decoding time value; or, the third time length is determined according to a value of $K_1$, or the third time length is determined according to a time domain position of a Physical Uplink Control Channel (PUCCH) resource indicated by a value of $K_1$, wherein $K_1$ is indicated through an HARQ feedback timing indication information field in a DCI format, or $K_1$ is provided through an HARQ feedback timing set; or, the third time length is determined according to a value of $K_{offset}$, or the third time length is determined according to a time domain position of a PUCCH resource indicated by a value of $K_{offset}$, wherein the value of $K_{offset}$ is indicated by a network device through at least one of a system message, a Radio Resource Control (RRC) message, a Media Access Control Control Element (MAC CE), and DCI; or, the third time length is determined according to a value of $K_1+K_{offset}$, or the third time length is determined according to a time domain position of a PUCCH resource indicated by a value of $K_1+K_{offset}$, wherein $K_1$ or $K_1+K_{offset}$ is indicated through an HARQ feedback timing indication information field in a DCI format, or, $K_1$ or $K_1+K_{offset}$ is provided through an HARQ feedback timing set, or a value of $K_{offset}$ is indicated by a network device through at least one of a system message, an RRC message, a MAC CE, and DCI; or, the third time length is determined according to a processing time of preparing to send a PDSCH by a network device; or, the third time length is determined according to a larger value of a PDSCH decoding time value and a processing time value of preparing to send a PDSCH by a network device; or, the third time length is determined according to a smaller value of a PDSCH decoding time value and a processing time value of preparing to send a PDSCH by a network device.

Optionally, the third time length is determined according to a time domain position of a PUCCH resource, including: the third time length is determined according to a time domain position corresponding to a first symbol of a PUCCH resource; or, the third time length is determined according to a time domain position corresponding to a last symbol of a PUCCH resource.

Optionally, the PDSCH decoding time value is related to a subcarrier spacing configuration of a PDSCH.

Optionally, the first downlink HARQ process corresponds to the first state, including: the first downlink HARQ process is a disabled HARQ process; or, the first downlink HARQ process is configured with a disabling parameter; or the first downlink HARQ process does not correspond to an uplink Hybrid Automatic Repeat request-Acknowledgement (HARQ-ACK) feedback.

Optionally, in some implementations, the communication unit may be a communication interface or a transceiver, or an input/output interface of a communication chip or a system on a chip. The processing unit may be one or more processors.

It should be understood that the terminal device 700 in accordance with an implementation of the present disclosure may correspond to the terminal device in the method implementation of the present disclosure, and the above-mentioned and other operations and/or functions of various units in the terminal device 700 are respectively for implementing corresponding processes of the terminal device in the method 400 shown in FIG. 10, and will not be repeated herein for brevity.

Figure 17:
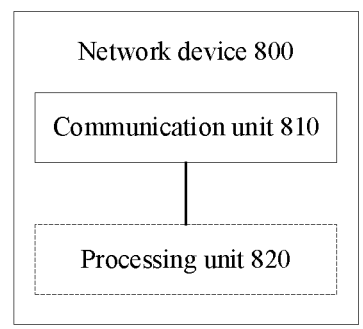
FIG. 17 is a schematic block diagram of another network device according to an implementation of the present disclosure.

FIG. 17 shows a schematic block diagram of a network device 800 according to an implementation of the present disclosure. As shown in FIG. 17, the network device 800 includes: a communication unit 810, configured to send a Physical Downlink Shared Channel (PDSCH) to a terminal device using a first downlink Hybrid Automatic Repeat reQuest (HARQ) process, wherein the first downlink HARQ process corresponds to a first state, and a time interval between two adjacent PDSCH transmissions corresponding to the first downlink HARQ process is greater than or equal to a third time length.

Optionally, the terminal device 800 further includes a processing unit 820.

Optionally, the time interval between two adjacent PDSCH transmissions corresponding to the first downlink HARQ process is greater than or equal to the third time length, including: the communication unit 810 is further configured to send a first PDSCH to the terminal device using the first downlink HARQ process, wherein the first PDSCH includes at least one PDSCH; the processing unit 820 is further configured not to use the first downlink HARQ process to send a second PDSCH within the third time length after a last symbol transmitted by a target PDSCH in the first PDSCH; or, in a case where the terminal device is scheduled to receive or decode a second PDSCH sent by the network device using the first downlink HARQ process within the third time length after a last symbol transmitted by a target PDSCH in the first PDSCH, the processing unit 820 is further configured to assume that the terminal device does not receive or decode the second PDSCH; or, in a case where the terminal device is scheduled to receive or decode a second PDSCH sent by the network device using the first downlink HARQ process after the third time length after a last symbol transmitted by a target PDSCH in the first PDSCH, the processing unit 820 is further configured to assume that the terminal device receives or decodes the second PDSCH.

Optionally, the time interval between two adjacent PDSCH transmissions corresponding to the first downlink HARQ process is greater than or equal to the third time length, including: the communication unit 810 is further configured to send a first PDSCH to the terminal device using the first downlink HARQ process, wherein the first PDSCH includes at least one PDSCH; the communication unit 810 is further configured not to send a second PDCCH for scheduling the first downlink HARQ process to transmit a second PDSCH, within the third time length after a last symbol transmitted by a target PDSCH in the first PDSCH; or, in a case where the terminal device is scheduled to receive, within the third time length after a last symbol transmitted by a target PDSCH in the first PDSCH, a second PDCCH for the network device scheduling the first downlink HARQ process to transmit a second PDSCH, the processing unit 820 is further configured to assume that the terminal device does not receive or decode the second PDSCH; or, in a case where the terminal device is scheduled to receive, after the third time length after a last symbol transmitted by a target PDSCH in the first PDSCH, a second PDCCH for the network device scheduling the first downlink HARQ process to transmit a second PDSCH, the processing unit 820 is further configured to assume that the terminal device receives or decodes the second PDSCH.

Optionally, the communication unit 810 is further configured to send first configuration information to the terminal device, wherein in a case where the terminal device is configured with Discontinuous Reception (DRX), the first configuration information is used for configuring the terminal device to start a third timer after a last symbol transmitted by a target PDSCH in the first PDSCH, wherein the third timer is used for indicating a time window within which the terminal device does not expect to receive a second PDCCH, or the third timer is used for indicating a time window within which the terminal device does not expect to receive a second PDSCH, and the second PDCCH is used for the network device to schedule the first downlink HARQ process to transmit the second PDSCH.

Optionally, the communication unit 810 is further configured to send second configuration information to the terminal device, wherein the second configuration information is used for configuring the terminal device to start a fourth timer after the third timer expires, and the fourth timer is used for indicating a time window within which the terminal device is possible to receive the second PDCCH or the second PDSCH.

Optionally, the fourth timer is a DRX downlink retransmission timer, and/or the second configuration information includes the fourth timer.

Optionally, a time length of the third timer is less than or equal to the third time length.

Optionally, the third timer is a DRX downlink HARQ Round Trip Time (RTT) timer, and/or the first configuration information includes the third timer.

Optionally, the target PDSCH is a first PDSCH in the first PDSCH; or, the target PDSCH is a last PDSCH in the first PDSCH.

Optionally, first PDSCHs include at least two PDSCHs, and the at least two PDSCHs are continuous in a time domain, or the at least two PDSCHs occupy at least two continuous time slots in a time domain.

Optionally, the first PDSCH is scheduled through one PDCCH, or the first PDSCH corresponds to one PDCCH.

Optionally, the first PDSCH is a PDSCH scheduled by a PDCCH, or the first PDSCH is a Semi-Persistent Scheduling (SPS) PDSCH.

Optionally, the third time length is determined according to a PDSCH decoding time value; or, the third time length is determined according to a processing time $T_{proc,1}$, wherein $T_{proc,1}$ is determined according to a PDSCH decoding time value; or, the third time length is determined according to a value of $K_1$, or the third time length is determined according to a time domain position of a Physical Uplink Control Channel (PUCCH) resource indicated by a value of $K_1$, wherein $K_1$ is indicated through an HARQ feedback timing indication information field in a DCI format, or $K_1$ is provided through an HARQ feedback timing set; or, the third time length is determined according to a value of $K_{offset}$, or the third time length is determined according to a time domain position of a PUCCH resource indicated by a value of $K_{offset}$, wherein the value of $K_{offset}$ is indicated by a network device through at least one of a system message, a Radio Resource Control (RRC) message, a Media Access Control Control Element (MAC CE), and DCI; or, the third time length is determined according to a value of $K_1+K_{offset}$, or the third time length is determined according to a time domain position of a PUCCH resource indicated by a value of $K_1+K_{offset}$, wherein $K_1$ or $K_1+K_{offset}$ is indicated through an HARQ feedback timing indication information field in a DCI format, or, $K_1$ or $K_1+K_{offset}$ is provided through an HARQ feedback timing set, or a value of $K_{offset}$ is indicated by a network device through at least one of a system message, an RRC message, a MAC CE, and DCI; or, the third time length is determined according to a processing time of preparing to send a PDSCH by a network device; or, the third time length is determined according to a larger value of a PDSCH decoding time value and a processing time value of preparing to send a PDSCH by a network device; or, the third time length is determined according to a smaller value of a PDSCH decoding time value and a processing time value of preparing to send a PDSCH by a network device.

Optionally, the third time length is determined according to a time domain position of a PUCCH resource, including: the third time length is determined according to a time domain position corresponding to a first symbol of a PUCCH resource; or, the third time length is determined according to a time domain position corresponding to a last symbol of a PUCCH resource.

Optionally, the PDSCH decoding time value is related to a subcarrier spacing configuration of a PDSCH.

Optionally, the first downlink HARQ process corresponds to the first state, including: the first downlink HARQ process is a disabled HARQ process; or, the first downlink HARQ process is configured with a disabling parameter; or the first downlink HARQ process does not correspond to an uplink Hybrid Automatic Repeat request-Acknowledgement (HARQ-ACK) feedback.

Optionally, in some implementations, the communication unit may be a communication interface or a transceiver, or an input/output interface of a communication chip or a system on a chip. The processing unit may be one or more processors.

It should be understood that the network device 800 in accordance with an implementation of the present disclosure may correspond to the network device in the method implementation of the present disclosure, and the above-mentioned and other operations and/or functions of various units in the network device 800 are respectively for implementing corresponding processes of the network device in the method 400 shown in FIG. 10, and will not be repeated herein for brevity.

Figure 18:
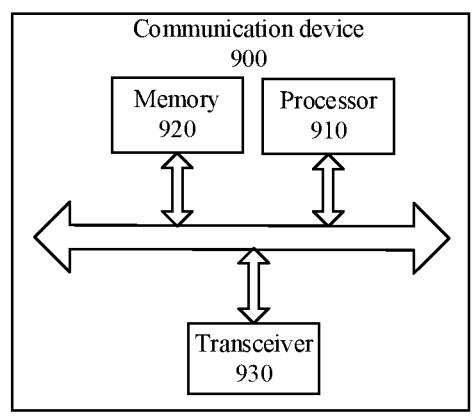
FIG. 18 is a schematic block diagram of a communication device according to an implementation of the present disclosure.

FIG. 18 is a schematic structure diagram of a communication device 900 in accordance with an implementation of the present disclosure. The communication device 900 shown in FIG. 18 includes a processor 910, wherein the processor 910 may invoke and run a computer program from a memory to implement the method in an implementation of the present disclosure.

Optionally, as shown in FIG. 18, the communication device 900 may further include a memory 920. The processor 910 may invoke and run a computer program from the memory 920 to implement the method in an implementation of the present disclosure.

The memory 920 may be a separate device independent of the processor 910, or may be integrated in the processor 910.

Optionally, as shown in FIG. 18, the communication device 900 may further include a transceiver 930, and the processor 910 may control the transceiver 930 to communicate with other devices. Specifically, the transceiver 1530 may send information or data to other devices or receive information or data sent by other devices.

The transceiver 930 may include a transmitter and a receiver. The transceiver 930 may further include antennas, a quantity of which may be one or more.

Optionally, the communication device 900 may specifically be the network device according to the implementations of the present disclosure, and the communication device 900 may implement corresponding processes implemented by the network device in various methods in the implementations of the present disclosure, which will not be repeated here for brevity.

Optionally, the communication device 900 may specifically be the mobile terminal/terminal device in accordance with an implementation of the present disclosure, and the communication device 900 may implement the corresponding processes implemented by the mobile terminal/terminal device in various methods in the implementations of the present disclosure, which will not be repeated herein for brevity.

Figure 19:
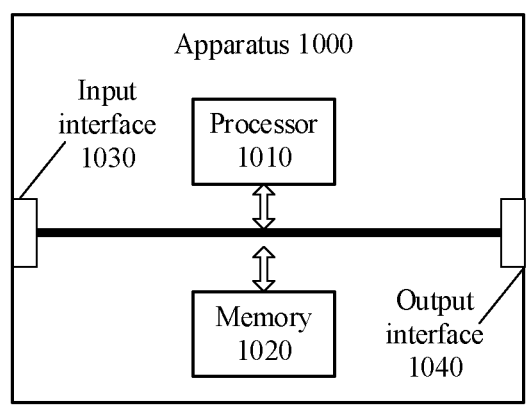
FIG. 19 is a schematic block diagram of an apparatus according to an implementation of the present disclosure.

FIG. 19 is a schematic structural diagram of an apparatus in accordance with an implementation of the present disclosure. The apparatus 1000 shown in FIG. 19 includes a processor 1010. The processor 1010 may call and run a computer program from a memory to implement the methods in the implementations of the present disclosure.

Optionally, as shown in FIG. 19, the apparatus 1000 may further include a memory 1020. The processor 1010 may invoke and run a computer program from the memory 1020 to implement the method in an implementation of the present disclosure.

The memory 1020 may be a separate device independent of the processor 1010, or may be integrated in the processor 1010.

Optionally, the apparatus 1000 may further include an input interface 1030. The processor 1010 may control the input interface 1030 to communicate with another device or chip. Specifically, the processor 1010 may acquire information or data sent by another device or chip.

Optionally, the apparatus 1000 may further include an output interface 1040. The processor 1010 may control the output interface 1040 to communicate with another device or chip. Specifically, the processor 1010 may output information or data to another device or chip.

Optionally, the apparatus may be applied to the network device in the implementations of the present disclosure, and the apparatus may implement the corresponding processes implemented by the network device in various methods in the implementations of the present disclosure, which will not be repeated herein for brevity.

Optionally, the apparatus may be applied to the mobile terminal/terminal device in the implementations of the present disclosure, and the apparatus may implement the corresponding processes implemented by the mobile terminal/terminal device in various methods in the implementations of the present disclosure, which will not be repeated herein for brevity.

Optionally, the apparatus mentioned in an implementation of the present disclosure may also be a chip. For example, it may be a system-level chip, a system chip, a chip system, or a system on chip, etc.

Figure 20:
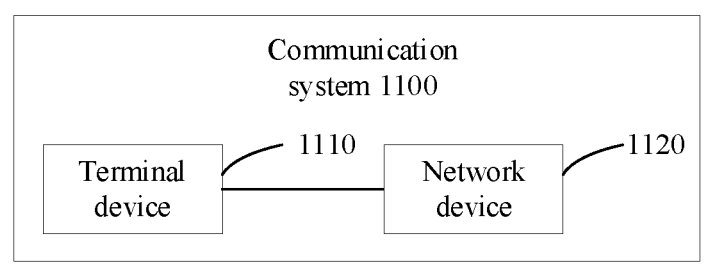
FIG. 20 is a schematic block diagram of a communication system according to an implementation of the present disclosure.

FIG. 20 is a schematic block diagram of a communication system 1100 in accordance with an implementation of the present disclosure. As shown in FIG. 20, the communication system 1100 includes a terminal device 1110 and a network device 1120.

The terminal device 1110 may be configured to implement the corresponding functions implemented by the terminal device in the above-mentioned methods, and the network device 1120 may be configured to implement the corresponding functions implemented by the network device in the above-mentioned methods, which will not be repeated herein for brevity.

It should be understood that the processor in the implementations of the present disclosure may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present disclosure. The general purpose processor may be a microprocessor or the processor may be any conventional processor. The acts of the methods disclosed in connection with the implementations of the present disclosure may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the implementations of the present disclosure may be a transitory memory or a non-transitory memory, or may include both transitory and non-transitory memories. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that the above memories are described as examples rather than limitations. For example, the memory in the implementations of the present disclosure may be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM) and a direct Rambus RAM (DR RAM), etc. That is to say, the memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied to the network device in the implementations of the present disclosure, and the computer program causes a computer to perform the corresponding processes implemented by the network device in various methods in accordance with the implementations of the present disclosure, which will not be repeated herein for brevity.

Optionally, the computer readable storage medium may be applied to the mobile terminal/terminal device in the implementations of the present disclosure, and the computer program causes a computer to perform the corresponding processes implemented by the mobile terminal/terminal device in various methods in accordance with the implementations of the present disclosure, which will not be repeated herein for brevity.

An implementation of the present disclosure further provides a computer program product, including computer program instructions.

Optionally, the computer program product may be applied to the network device in the implementations of the present disclosure, and the computer program instructions cause a computer to perform the corresponding processes implemented by the network device in various methods in accordance with the implementations of the present disclosure, which will not be repeated herein for brevity.

Optionally, the computer program product may be applied to the mobile terminal/terminal device in the implementations of the present disclosure, and the computer program instructions cause a computer to perform the corresponding processes implemented by the mobile terminal/terminal device in various methods in accordance with the implementations of the present disclosure, which will not be repeated herein for brevity.

An implementation of the present disclosure further provides a computer program.

Optionally, the computer program may be applied to the network device in the implementations of the present disclosure. When the computer program is run on a computer, the computer is enabled to perform corresponding processes implemented by the network device in various methods according to the implementations of the present disclosure, which will not be repeated here for brevity.

Optionally, the computer program may be applied to the mobile terminal/terminal device in the implementations of the present disclosure. The computer program, when is run on a computer, causes the computer to perform the corresponding processes implemented by the mobile terminal/terminal device in various methods in accordance with the implementations of the present disclosure, which will not be repeated herein for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present disclosure.

Those skilled in the art may clearly understand that for convenience and conciseness of description, specific working processes of the systems, apparatuses, and units described above may refer to corresponding processes in the aforementioned method implementations, and details will not be repeated here.

In several implementations according to the present disclosure, it should be understood that the disclosed systems, apparatuses, and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

The units described as separate components may be or may be not physically separated, and the component shown as a unit may be or may be not a physical unit, i.e., it may be located in one place or may be distributed on multiple network units. Part or all of units may be selected according to actual needs to achieve purposes of technical solutions of the implementations.

In addition, various functional units in various implementations of the present disclosure may be integrated in one processing unit, or various units may be physically present separately, or two or more units may be integrated in one unit.

The functions, if implemented in a form of software functional units and sold or used as an independent product, may be stored in a computer readable storage medium. Based on such understanding, the technical schemes of the present disclosure, in essence, or the part which contributes to the prior art, or part of the technical schemes, may be embodied in the form of a software product, which is stored in a storage medium including a number of instructions for causing a computer device (which may be a personal computer, a server or a network device, etc.) to perform all or part of the steps of various implementations of the present disclosure. The aforementioned storage medium includes various media capable of storing program codes, such as a U disk, a mobile hard disk, a read-only memory (ROM), a random access memory (RAM), a magnetic disk, or an optical disk, etc.

The foregoing are merely specific implementations of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure should be subject to the protection scope of the claims.

The invention claimed is:

1. A channel transmission method, comprising:
receiving, by a terminal device, a Physical Downlink Shared Channel (PDSCH) sent by a network device using a first downlink Hybrid Automatic Repeat reQuest (HARQ) process, wherein the first downlink HARQ process corresponds to a first state, and a time interval between two adjacent PDSCH transmissions corresponding to the first downlink HARQ process is greater than or equal to a third time length;
wherein the first downlink HARQ process corresponds to the first state, comprising:
the first downlink HARQ process is configured with a disabling parameter; wherein the time interval between the two adjacent PDSCH transmissions corresponding to the first downlink HARQ process is greater than or equal to the third time length, comprising:
receiving, by the terminal device, a first PDSCH sent by the network device using the first downlink HARQ process;
not receiving, by the terminal device, within the third time length after a last symbol transmitted by a target PDSCH in the first PDSCH, a second Physical Downlink Control Channel (PDCCH) for the network device scheduling the first downlink HARQ process to transmit a second PDSCH; wherein, the target PDSCH is a starting PDSCH, or the target PDSCH is a last PDSCH in the first PDSCH;
wherein the third time length is determined according to a processing time $T_{proc,1}$, wherein $T_{proc,1}$ is determined according to the PDSCH decoding time value; wherein the PDSCH decoding time value is related to a subcarrier spacing configuration of the PDSCH;
wherein the first PDSCH comprises at least two different PDSCHs, wherein the at least two different PDSCHs are continuous in a time domain, or the at least two different PDSCHs occupy at least two continuous time slots in the time domain.

2. A terminal device, comprising:
a processor and a transceiver, wherein
the transceiver is configured to receive a Physical Downlink Shared Channel (PDSCH) sent by a network device using a first downlink Hybrid Automatic Repeat reQuest (HARQ) process, wherein the first downlink HARQ process corresponds to a first state, and a time interval between two adjacent PDSCH transmissions corresponding to the first downlink HARQ process is greater than or equal to a third time length;
wherein the first downlink HARQ process corresponds to the first state, comprising:
the first downlink HARQ process is configured with a disabling parameter; wherein the time interval between the two adjacent PDSCH transmissions corresponding to the first downlink HARQ process is greater than or equal to the third time length, comprising:
the transceiver is further configured to receive a first PDSCH sent by the network device using the first downlink HARQ process;
the processor is configured not to receive within the third time length after a last symbol transmitted by a target PDSCH in the first PDSCH, a second Physical Downlink Control Channel (PDCCH) for the network device scheduling the first downlink HARQ process to transmit a second PDSCH; wherein, the target PDSCH is a starting PDSCH, or the target PDSCH is a last PDSCH in the first PDSCH;
wherein the third time length is determined according to a processing time $T_{proc,1}$, wherein $T_{proc,1}$ is determined according to the PDSCH decoding time value; wherein the PDSCH decoding time value is related to a subcarrier spacing configuration of the PDSCH;
wherein the first PDSCH comprises at least two different PDSCHs, wherein the at least two different PDSCHs are continuous in a time domain, or the at least two different PDSCHs occupy at least two continuous time slots in the time domain.

3. A network device, comprising: a processor and a transceiver, wherein the transceiver is configured to send a Physical Downlink Shared Channel (PDSCH) to a terminal device using a first downlink Hybrid Automatic Repeat reQuest (HARQ) process, wherein the first downlink HARQ process corresponds to a first state, and a time interval between two adjacent PDSCH transmissions corresponding to the first downlink HARQ process is greater than or equal to a third time length;
- wherein the first downlink HARQ process is configured with a disabling parameter;
- wherein the time interval between the two adjacent PDSCH transmissions corresponding to the first downlink HARQ process is greater than or equal to the third time length, the transceiver is further configured to send a first PDSCH to the terminal device using the first downlink HARQ process, wherein the first PDSCH comprises at least two different PDSCHs;
- the processor is configured not to send a second Physical Downlink Control Channel (PDCCH) for scheduling the first downlink HARQ process to transmit a second PDSCH within the third time length after a last symbol transmitted by a target PDSCH in the first PDSCH; wherein, the target PDSCH is a starting PDSCH in the first PDSCH; or, the target PDSCH is a last PDSCH in the first PDSCH; wherein the third time length is determined according to a processing time $T_{proc,1}$, wherein $T_{proc,1}$ is determined according to the PDSCH decoding time value; wherein the PDSCH decoding time value is related to a subcarrier spacing configuration of the PDSCH;
- wherein the at least two different PDSCHs are continuous in a time domain, or the at least two different PDSCHs occupy at least two continuous time slots in the time domain.

\* \* \* \* \*